US009406194B2

(12) United States Patent
Kelly et al.

(10) Patent No.: US 9,406,194 B2
(45) Date of Patent: Aug. 2, 2016

(54) METHOD AND SYSTEM FOR DYNAMICALLY AWARDING BONUS POINTS

(75) Inventors: Bryan M. Kelly, Alamo, CA (US); Robert Anthony Luciano, Jr., Reno, NV (US)

(73) Assignee: BALLY GAMING, INC., Las Vegas, NV (US)

( * ) Notice: Subject to any disclaimer, the term of this patent is extended or adjusted under 35 U.S.C. 154(b) by 2575 days.

(21) Appl. No.: 12/112,582

(22) Filed: Apr. 30, 2008

(65) Prior Publication Data

US 2009/0275399 A1 Nov. 5, 2009

(51) Int. Cl.
*A63F 13/00* (2014.01)
*G07F 17/32* (2006.01)

(52) U.S. Cl.
CPC .......... *G07F 17/323* (2013.01); *G07F 17/3244* (2013.01)

(58) Field of Classification Search
USPC .......................................................... 463/20
See application file for complete search history.

(56) References Cited

U.S. PATENT DOCUMENTS

| | | | | |
|---|---|---|---|---|
| 4,031,376 A | | 6/1977 | Corkin, Jr. | 235/156 |
| 4,339,798 A | | 7/1982 | Hedges et al. | |
| 4,635,937 A | | 1/1987 | Dickinson et al. | 273/143 R |
| 4,660,833 A | | 4/1987 | Dickinson et al. | 273/143 R |
| 4,693,477 A | | 9/1987 | Dickinson et al. | 273/143 R |
| 4,711,452 A | | 12/1987 | Dickinson et al. | 273/143 R |
| 4,755,941 A | | 7/1988 | Bacchi | 364/412 |
| 4,802,218 A | | 1/1989 | Wright et al. | 380/23 |
| 4,926,996 A | | 5/1990 | Eglise et al. | 194/212 |
| 5,050,881 A | | 9/1991 | Nagao | 273/143 R |
| 5,058,893 A | | 10/1991 | Dickinson et al. | 273/143 R |
| 5,152,529 A | | 10/1992 | Okada | |
| 5,179,517 A | | 1/1993 | Sarbin et al. | 364/410 |
| 5,265,874 A | | 11/1993 | Dickinson et al. | 273/138 A |
| 5,275,400 A | | 1/1994 | Weingardt et al. | 273/85 CP |
| 5,321,241 A | * | 6/1994 | Craine | 463/25 |
| 5,332,219 A | | 7/1994 | Marnell, II et al. | 273/138 A |
| 5,361,885 A | | 11/1994 | Modler | 194/214 |
| 5,395,111 A | | 3/1995 | Inoue | 273/143 R |

(Continued)

FOREIGN PATENT DOCUMENTS

| | | |
|---|---|---|
| DE | 199 40 954 A1 | 3/2001 |
| EP | 1463008 A2 | 9/2004 |

(Continued)

OTHER PUBLICATIONS

Bally Technologies, "Introducing the New Bally Alpha Elite™ S9C," 12 pages.

(Continued)

*Primary Examiner* — Masud Ahmed
(74) *Attorney, Agent, or Firm* — Seed IP Law Group PLLC

(57) ABSTRACT

A player of an enhanced game receives a bonus for playing the enhanced game and a chance for an additional extra award. The additional extra award may be based on one or more factors: the actual game title of the game being played by the player, the rate of gameplay by the player, the rate of gain/loss for an entity different from the player, a rate of gain/loss for the player, or the like. Gameplay and player data may be gathered and a dynamic bonusing system may reconfigure a gaming machine being played by the player based at least on the gathered data.

46 Claims, 12 Drawing Sheets

(56) References Cited

U.S. PATENT DOCUMENTS 5,466,010 A 11/1995 Spooner ........ 283/67
5,493,613 A 2/1996 Denno et al.
5,505,461 A 4/1996 Bell et al. ........ 273/433
5,511,784 A 4/1996 Furry et al. ........ 273/143 R
5,559,312 A 9/1996 Lucero
5,564,700 A 10/1996 Celona ........ 463/27
5,584,764 A 12/1996 Inoue ........ 463/20
5,586,936 A 12/1996 Bennett et al. ........ 463/25
5,609,524 A 3/1997 Inoue ........ 463/20
5,613,912 A 3/1997 Slater ........ 463/25
5,636,843 A 6/1997 Roberts ........ 273/292
5,639,088 A * 6/1997 Schneider et al. ........ 273/138.2
5,651,548 A 7/1997 French et al. ........ 273/309
5,655,961 A 8/1997 Acres et al. ........ 463/27
5,698,839 A 12/1997 Jagielinski et al. ........ 235/493
5,702,302 A 12/1997 Gauselmann ........ 463/20
5,704,835 A 1/1998 Dietz, II ........ 463/20
5,722,891 A 3/1998 Inoue ........ 463/20
5,735,742 A 4/1998 French ........ 463/25
5,752,881 A 5/1998 Inoue ........ 463/20
5,766,075 A 6/1998 Cook et al. ........ 463/25
5,770,533 A 6/1998 Franchi ........ 463/42
5,775,692 A 7/1998 Watts et al. ........ 273/143 R
5,788,573 A 8/1998 Baerlocher et al. ........ 463/16
5,800,268 A 9/1998 Molnick
5,803,453 A 9/1998 Stephan et al.
5,803,808 A 9/1998 Strisower ........ 463/11
5,813,912 A 9/1998 Shultz ........ 463/25
5,816,918 A 10/1998 Kelly et al.
5,823,879 A 10/1998 Goldberg et al. ........ 463/42
5,830,067 A 11/1998 Graves et al. ........ 463/40
5,831,669 A 11/1998 Adrain ........ 348/143
5,848,932 A 12/1998 Adams ........ 463/20
5,851,149 A 12/1998 Xidos et al.
5,863,249 A 1/1999 Inoue ........ 463/20
5,882,261 A 3/1999 Adams ........ 463/20
5,902,983 A 5/1999 Crevelt et al. ........ 235/380
5,919,090 A 7/1999 Mothwurf ........ 463/25
5,919,091 A 7/1999 Bell et al. ........ 463/25
5,947,820 A 9/1999 Morro et al. ........ 463/9
5,984,782 A 11/1999 Inoue ........ 463/20
5,999,808 A 12/1999 LaDue ........ 455/412
6,001,016 A 12/1999 Walker et al. ........ 463/42
6,003,013 A 12/1999 Boushy et al. ........ 705/10
6,003,867 A 12/1999 Rodesch et al.
6,004,207 A 12/1999 Wilson, Jr. et al. ........ 463/20
6,010,404 A 1/2000 Walker et al. ........ 463/21
6,027,115 A 2/2000 Griswold et al. ........ 273/143 R
6,039,650 A 3/2000 Hill ........ 463/47
6,048,269 A 4/2000 Burns et al. ........ 463/25
6,059,289 A 5/2000 Vancura ........ 273/143 R
6,068,552 A 5/2000 Walker et al. ........ 463/21
6,068,553 A 5/2000 Parker ........ 463/27
6,083,105 A 7/2000 Ronin et al. ........ 463/17
6,089,978 A 7/2000 Adams ........ 463/20
6,089,980 A 7/2000 Gauselmann ........ 463/27
6,102,799 A 8/2000 Stupak ........ 463/27
6,105,962 A 8/2000 Malavazos et al. ........ 273/143 R
6,106,395 A 8/2000 Begis ........ 463/23
6,110,041 A 8/2000 Walker et al. ........ 463/20
6,110,043 A 8/2000 Olsen ........ 463/27
6,113,098 A 9/2000 Adams ........ 273/143 R
6,113,492 A 9/2000 Walker et al. ........ 463/16
6,113,493 A 9/2000 Walker et al. ........ 463/25
6,117,009 A 9/2000 Yoseloff ........ 463/20
6,142,876 A 11/2000 Cumbers ........ 463/25
6,146,273 A 11/2000 Olsen ........ 463/27
6,154,131 A 11/2000 Jones, II et al. ........ 340/540
6,155,925 A 12/2000 Giobbi et al.
6,159,096 A 12/2000 Yoseloff ........ 463/20
6,162,121 A 12/2000 Morro et al. ........ 463/16
6,165,069 A 12/2000 Sines et al. ........ 463/12
6,165,070 A 12/2000 Nolte et al. ........ 463/20
6,165,071 A 12/2000 Weiss ........ 463/24
6,168,520 B1 1/2001 Baerlocher et al. ........ 463/16
6,168,523 B1 1/2001 Piechowiak et al. ........ 463/26
6,183,362 B1 2/2001 Boushy ........ 463/25
6,183,366 B1 2/2001 Goldberg et al. ........ 463/42
6,186,894 B1 2/2001 Mayeroff ........ 463/20
6,190,256 B1 2/2001 Walker et al. ........ 463/25
6,203,430 B1 3/2001 Walker et al. ........ 463/20
6,213,877 B1 4/2001 Walker et al. ........ 463/26
6,220,959 B1 4/2001 Holmes, Jr. et al. ........ 463/13
6,224,483 B1 5/2001 Mayeroff ........ 463/20
6,224,484 B1 5/2001 Okuda et al. ........ 463/27
6,227,971 B1 5/2001 Weiss ........ 463/20
6,227,972 B1 5/2001 Walker et al. ........ 463/25
6,234,898 B1 5/2001 Belamant et al. ........ 463/25
6,244,958 B1 6/2001 Acres ........ 463/26
6,267,671 B1 * 7/2001 Hogan ........ 463/25
6,282,522 B1 8/2001 Davis et al.
6,299,536 B1 10/2001 Hill ........ 463/47
6,302,793 B1 10/2001 Fertitta, III et al.
6,309,300 B1 10/2001 Glavich ........ 463/26
6,311,976 B1 11/2001 Yoseloff et al. ........ 273/138.2
6,312,332 B1 11/2001 Walker et al.
6,318,721 B1 11/2001 Randall et al. ........ 273/148 R
6,322,078 B1 11/2001 Adams ........ 273/292
6,328,649 B1 12/2001 Randall et al. ........ 463/20
6,334,814 B1 1/2002 Adams ........ 463/20
6,336,863 B1 1/2002 Baerlocher et al. ........ 463/27
6,346,043 B1 2/2002 Colin et al. ........ 463/17
6,347,738 B1 2/2002 Crevelt et al. ........ 235/380
6,350,199 B1 2/2002 Williams et al. ........ 463/16
6,358,146 B1 3/2002 Adams ........ 463/20
6,361,437 B1 3/2002 Walker et al.
6,375,570 B1 4/2002 Poole ........ 463/31
6,394,900 B1 5/2002 McGlone et al. ........ 463/20
6,394,902 B1 5/2002 Glavich ........ 463/20
6,394,907 B1 5/2002 Rowe ........ 463/42
6,398,220 B1 6/2002 Inoue ........ 273/142 R
6,406,369 B1 6/2002 Baerlocher et al. ........ 463/20
6,409,595 B1 6/2002 Uihlein et al. ........ 463/29
6,409,602 B1 6/2002 Wiltshire et al. ........ 463/42
6,413,162 B1 7/2002 Baerlocher et al. ........ 463/20
6,446,864 B1 9/2002 Kim et al. ........ 235/382
6,460,848 B1 10/2002 Soltys et al. ........ 273/149 R
6,461,241 B1 10/2002 Webb et al. ........ 463/20
6,464,581 B1 10/2002 Yoseloff ........ 463/20
6,464,582 B1 10/2002 Baerlocher et al. ........ 463/20
6,464,584 B2 10/2002 Oliver ........ 463/25
6,468,155 B1 10/2002 Zucker et al.
6,494,454 B2 12/2002 Adams ........ 273/292
6,494,785 B1 12/2002 Gerrard et al. ........ 463/20
6,505,772 B1 1/2003 Mollett et al. ........ 235/379
6,508,709 B1 1/2003 Karmarkar ........ 463/42
6,508,710 B1 1/2003 Paravia et al. ........ 463/42
6,514,140 B1 2/2003 Storch ........ 463/25
6,517,435 B2 2/2003 Soltys et al. ........ 463/25
6,517,436 B2 2/2003 Soltys et al. ........ 463/29
6,520,856 B1 2/2003 Walker et al.
6,520,857 B2 2/2003 Soltys et al. ........ 463/29
6,527,271 B2 3/2003 Soltys et al. ........ 273/148 R
6,527,638 B1 3/2003 Walker et al.
6,530,836 B2 3/2003 Soltys et al. ........ 463/29
6,530,837 B2 3/2003 Soltys et al. ........ 463/29
6,533,276 B2 3/2003 Soltys et al. ........ 273/148 R
6,533,662 B2 3/2003 Soltys et al. ........ 463/25
6,547,131 B1 4/2003 Foodman et al. ........ 235/380
6,561,900 B1 5/2003 Baerlocher et al. ........ 463/20
6,565,433 B1 5/2003 Baerlocher et al. ........ 463/20
6,565,436 B1 5/2003 Baerlocher ........ 463/26
6,575,834 B1 6/2003 Lindo ........ 463/40
6,579,179 B2 6/2003 Poole et al. ........ 463/25
6,579,180 B2 6/2003 Soltys et al. ........ 463/25
6,579,181 B2 6/2003 Soltys et al. ........ 463/25
6,585,598 B2 7/2003 Nguyen et al. ........ 463/41
6,595,854 B2 7/2003 Hughs-Baird et al. ........ 463/20
6,595,857 B2 7/2003 Soltys et al. ........ 463/29
6,602,136 B1 8/2003 Baerlocher et al. ........ 463/16
6,602,137 B2 8/2003 Kaminkow et al. ........ 463/16
6,605,000 B2 8/2003 Adams ........ 463/20
6,607,441 B1 8/2003 Acres ........ 463/25
6,612,928 B1 9/2003 Bradford et al.

(56) References Cited

U.S. PATENT DOCUMENTS 6,620,047 B1 9/2003 Alcorn et al. ................... 463/37
6,623,357 B2 9/2003 Chowdhury ..................... 463/25
6,629,591 B1 10/2003 Griswold et al. ............. 194/205
6,629,889 B2 10/2003 Mothwurf ........................ 463/25
6,632,139 B1 10/2003 Baerlocher ..................... 463/16
6,632,141 B2 10/2003 Webb et al. ..................... 463/25
6,634,943 B1 10/2003 Baerlocher ..................... 463/25
6,634,945 B2 10/2003 Glavich et al. .................. 463/25
6,638,161 B2 10/2003 Soltys et al. .................... 463/12
6,638,164 B2 10/2003 Randall et al. .................. 463/20
6,641,484 B2 11/2003 Oles et al. ....................... 463/47
6,645,078 B1 11/2003 Mattice ........................... 463/42
6,652,379 B2 11/2003 Soltys et al. .................... 463/22
6,663,488 B1 12/2003 Adams ............................ 463/17
6,663,489 B2 12/2003 Baerlocher ..................... 463/20
6,663,490 B2 12/2003 Soltys et al. .................... 463/25
6,672,589 B1 1/2004 Lemke et al. ................. 273/236
6,672,960 B1 1/2004 B-Jensen ......................... 463/20
6,676,510 B1 1/2004 Bittman et al. ................. 463/20
6,676,516 B2 1/2004 Baerlocher et al. ............. 463/25
6,676,522 B2 1/2004 Rowe et al. ..................... 463/42
6,682,423 B2 1/2004 Brosnan et al. ................. 463/29
6,685,568 B2 2/2004 Soltys et al. .................... 463/47
6,688,979 B2 2/2004 Soltys et al. .................... 463/25
6,695,696 B1 2/2004 Kaminkow ..................... 463/16
6,702,291 B2 3/2004 Grebler et al.
6,702,667 B2 3/2004 Mattice et al. .................. 463/16
6,702,675 B2 3/2004 Poole et al. ..................... 463/31
6,709,332 B2 3/2004 Adams ............................ 463/20
6,712,694 B1 3/2004 Nordman ........................ 463/20
6,712,695 B2 3/2004 Mothwurf et al.
6,712,696 B2 3/2004 Soltys et al. .................... 463/25
6,712,698 B2 3/2004 Paulsen et al. .................. 463/30
6,722,985 B2 4/2004 Criss-Puszkiewicz et al. . 463/29
6,726,563 B1 4/2004 Baerlocher et al. ............. 463/25
6,728,740 B2 4/2004 Kelly et al. ................... 708/250
6,729,956 B2 5/2004 Wolf et al. ...................... 463/25
6,733,389 B2 5/2004 Webb et al. ..................... 463/20
6,739,973 B1 5/2004 Lucchesi et al. ................ 463/35
6,739,975 B2 5/2004 Nguyen et al. .................. 463/39
6,745,330 B1 6/2004 Maillot ......................... 713/200
6,746,330 B2 6/2004 Cannon
6,752,312 B1 6/2004 Chamberlain et al. ........ 235/375
6,755,741 B1 6/2004 Rafaeli ........................... 463/25
6,758,751 B2 7/2004 Soltys et al. .................... 463/29
6,800,029 B2 10/2004 Rowe et al. ..................... 463/25
6,811,486 B1 11/2004 Luciano, Jr.
6,837,789 B2 1/2005 Garahi et al. ................... 463/29
6,846,238 B2 1/2005 Wells .............................. 463/39
6,848,994 B1 2/2005 Knust et al. ..................... 463/25
6,866,586 B2 3/2005 Oberberger et al. ............ 463/42
6,896,618 B2 5/2005 Benoy et al. .................... 463/25
6,905,411 B2 6/2005 Nguyen et al. .................. 463/25
6,960,134 B2 11/2005 Hartl et al. ...................... 463/20
6,969,319 B2 11/2005 Rowe et al. ..................... 463/25
6,971,956 B2 12/2005 Rowe et al. ..................... 463/25
6,991,544 B2 1/2006 Soltys et al. .................... 463/42
7,025,674 B2 4/2006 Adams et al.
7,029,009 B2 4/2006 Grauzer et al. ............ 273/149 P
7,035,626 B1 4/2006 Luciano, Jr.
7,063,617 B2 6/2006 Brosnan et al. ................. 463/25
7,086,947 B2 8/2006 Walker et al.
7,099,035 B2 8/2006 Brooks et al.
7,112,138 B2 9/2006 Hedrick et al. ................. 463/29
7,198,571 B2 4/2007 LeMay et al. ................... 463/25
7,213,812 B2 5/2007 Schubert et al. .......... 273/149 R
7,275,988 B2 10/2007 Aida et al.
7,278,917 B2 10/2007 McGlone et al. ............... 463/20
7,291,068 B2 11/2007 Bryant et al. ................... 463/25
7,311,605 B2 12/2007 Moser ............................ 463/25
7,316,615 B2 1/2008 Soltys et al. .................... 463/25
7,329,185 B2 2/2008 Conover et al.
7,331,859 B2 2/2008 Hornik et al.
7,364,510 B2 4/2008 Walker et al.
7,390,256 B2 6/2008 Soltys et al. .................... 463/12
7,399,226 B2 7/2008 Mishra ............................ 463/18
7,404,763 B2 7/2008 Malone et al.
7,407,438 B2 8/2008 Schubert et al. ................ 463/22
7,419,428 B2 9/2008 Rowe .............................. 463/25
7,427,234 B2 9/2008 Soltys et al. .................... 463/16
7,458,890 B2 12/2008 Loose et al.
7,494,413 B2 2/2009 Singer et al. .................... 463/20
7,510,474 B2 3/2009 Carter, Sr.
7,534,169 B2 5/2009 Amaitis et al.
7,540,806 B2 6/2009 Tastad
7,566,274 B2 7/2009 Johnson et al.
7,575,234 B2 8/2009 Soltys et al.
7,585,220 B2 9/2009 Loose et al.
7,611,409 B2 11/2009 Muir et al.
7,637,810 B2 12/2009 Amaitis et al.
7,644,861 B2 1/2010 Alderucci et al.
7,648,414 B2 1/2010 McNutt et al.
7,685,516 B2 3/2010 Fischer
7,690,995 B2 4/2010 Frankulin et al.
7,699,703 B2 4/2010 Muir et al.
7,730,198 B2 6/2010 Ruppert et al.
7,753,789 B2 7/2010 Walker et al.
7,780,526 B2 8/2010 Nguyen et al.
7,780,529 B2 8/2010 Rowe et al.
7,819,742 B2 10/2010 Chamberlain et al.
7,850,528 B2 12/2010 Wells
7,857,702 B2 12/2010 Hilbert
7,862,425 B2 1/2011 Cavagna
7,867,081 B2 1/2011 Schneider et al.
7,901,294 B2 3/2011 Walker et al.
7,937,464 B2 5/2011 Ruppert et al.
7,993,199 B2 8/2011 Iddings et al.
8,057,297 B2 11/2011 Silvestro et al.
8,062,121 B2 11/2011 Crivelli
8,135,793 B2 3/2012 Ruppert et al.
8,147,316 B2 4/2012 Arezina et al.
8,187,087 B2 5/2012 Herrmann et al.
8,195,825 B2 6/2012 Ruppert et al.
8,195,826 B2 6/2012 Ruppert et al.
8,235,811 B2 8/2012 Joshi et al.
8,235,825 B2 8/2012 French
8,241,111 B2 8/2012 Manfredi et al.
8,303,414 B2 11/2012 Joshi
8,308,554 B2 11/2012 Rowe et al.
2001/0019966 A1 9/2001 Idaka .............................. 463/40
2001/0036857 A1* 11/2001 Mothwurf et al. .............. 463/25
2002/0086725 A1 7/2002 Fasbender et al.
2002/0111210 A1 8/2002 Luciano, Jr. et al. ........... 463/29
2002/0111213 A1 8/2002 McEntee et al.
2002/0113371 A1 8/2002 Snow
2002/0115487 A1 8/2002 Wells .............................. 463/42
2002/0123376 A1 9/2002 Walker et al. ................... 463/11
2002/0142825 A1 10/2002 Lark et al. ....................... 463/16
2002/0142844 A1 10/2002 Kerr ............................... 463/42
2002/0142846 A1 10/2002 Paulsen ........................... 463/43
2002/0147047 A1 10/2002 Letovsky et al.
2002/0151363 A1 10/2002 Letovsky et al.
2003/0004871 A1 1/2003 Rowe
2003/0022714 A1 1/2003 Oliver ............................. 463/25
2003/0028480 A1 2/2003 Rowe .............................. 705/39
2003/0032474 A1 2/2003 Kaminkow ..................... 463/25
2003/0036425 A1 2/2003 Kaminkow et al. ............. 463/25
2003/0042679 A1 3/2003 Snow
2003/0045354 A1 3/2003 Giobbi ............................ 463/40
2003/0064798 A1 4/2003 Grauzer et al. ................. 463/29
2003/0083126 A1 5/2003 Paulsen ........................... 463/25
2003/0090064 A1 5/2003 Hoyt et al.
2003/0104865 A1 6/2003 Itkis et al. ....................... 463/39
2003/0186739 A1 10/2003 Paulsen et al. .................. 463/25
2003/0195037 A1 10/2003 Vuong et al. .................... 463/29
2003/0199320 A1 10/2003 Nguyen et al. .................. 463/42
2003/0212597 A1 11/2003 Ollins ............................ 705/14
2003/0224858 A1 12/2003 Yoseloff et al. ................. 463/43
2003/0232640 A1 12/2003 Walker et al.
2003/0232651 A1 12/2003 Huard et al. .................... 463/42
2004/0002388 A1 1/2004 Larsen et al.
2004/0029635 A1 2/2004 Giobbi ............................ 463/30
2004/0043815 A1 3/2004 Kaminkow ..................... 463/25
2004/0102244 A1 5/2004 Kryuchkov et al. ............ 463/32

(56) References Cited

U.S. PATENT DOCUMENTS

| | | | | |
|---|---|---|---|---|
| 2004/0110557 | A1 | 6/2004 | Rowe | 463/25 |
| 2004/0127291 | A1 | 7/2004 | George et al. | |
| 2004/0132529 | A1 | 7/2004 | Mkrtchyan et al. | 463/29 |
| 2004/0133485 | A1 | 7/2004 | Schoonmaker et al. | 705/30 |
| 2004/0142744 | A1 | 7/2004 | Atkinson et al. | |
| 2004/0166918 | A1 | 8/2004 | Walker et al. | 463/16 |
| 2004/0166940 | A1 | 8/2004 | Rothschild | |
| 2004/0219982 | A1 | 11/2004 | Khoo et al. | 463/42 |
| 2004/0254010 | A1 | 12/2004 | Fine | 463/25 |
| 2004/0254012 | A1 | 12/2004 | D'Amico et al. | 463/26 |
| 2004/0259618 | A1 | 12/2004 | Soltys et al. | 463/11 |
| 2004/0259630 | A1 | 12/2004 | Huard et al. | |
| 2005/0026680 | A1 | 2/2005 | Gururajan | 463/25 |
| 2005/0043094 | A1 | 2/2005 | Nguyen et al. | 463/42 |
| 2005/0051965 | A1 | 3/2005 | Gururajan | 273/292 |
| 2005/0054438 | A1 | 3/2005 | Rothschild et al. | 463/29 |
| 2005/0055113 | A1 | 3/2005 | Gauselmann | 700/91 |
| 2005/0070358 | A1 | 3/2005 | Angell et al. | 463/39 |
| 2005/0116020 | A1 | 6/2005 | Smolucha et al. | 235/375 |
| 2005/0119052 | A1 | 6/2005 | Russell et al. | |
| 2005/0121852 | A1 | 6/2005 | Soltys et al. | 273/149 P |
| 2005/0143166 | A1 | 6/2005 | Walker et al. | 463/25 |
| 2005/0171808 | A1 | 8/2005 | Saenz et al. | |
| 2005/0176507 | A1 | 8/2005 | Ephrati | |
| 2005/0181856 | A1 | 8/2005 | Cannon et al. | 463/16 |
| 2005/0181864 | A1 | 8/2005 | Britt et al. | 463/25 |
| 2005/0215311 | A1 | 9/2005 | Hornik et al. | 463/20 |
| 2005/0221882 | A1 | 10/2005 | Nguyen et al. | 463/16 |
| 2005/0227760 | A1 | 10/2005 | Vlazny et al. | 463/28 |
| 2005/0239542 | A1 | 10/2005 | Olsen | 463/27 |
| 2005/0255911 | A1* | 11/2005 | Nguyen et al. | 463/25 |
| 2005/0255922 | A1 | 11/2005 | Nguyen et al. | |
| 2005/0266919 | A1 | 12/2005 | Rowe et al. | 463/25 |
| 2005/0282614 | A1 | 12/2005 | Gauselmann | |
| 2005/0288083 | A1 | 12/2005 | Downs, III | 463/11 |
| 2005/0288084 | A1 | 12/2005 | Schubert | 463/11 |
| 2005/0288085 | A1 | 12/2005 | Schubert et al. | 463/11 |
| 2006/0003828 | A1 | 1/2006 | Abecassis | |
| 2006/0009282 | A1 | 1/2006 | George et al. | 463/29 |
| 2006/0019745 | A1 | 1/2006 | Benbrahim | 463/29 |
| 2006/0035707 | A1 | 2/2006 | Nguyen et al. | |
| 2006/0046849 | A1 | 3/2006 | Kovacs | 463/39 |
| 2006/0058100 | A1 | 3/2006 | Pacey et al. | |
| 2006/0063581 | A1* | 3/2006 | Harris et al. | 463/16 |
| 2006/0079310 | A1 | 4/2006 | Friedman et al. | 463/16 |
| 2006/0079317 | A1 | 4/2006 | Flemming et al. | |
| 2006/0121970 | A1 | 6/2006 | Khal | 463/16 |
| 2006/0183541 | A1 | 8/2006 | Okada et al. | 463/29 |
| 2006/0199649 | A1 | 9/2006 | Soltys et al. | 463/47 |
| 2006/0205461 | A1* | 9/2006 | LaRocca et al. | 463/1 |
| 2006/0205484 | A1 | 9/2006 | Nicastro | |
| 2006/0205508 | A1 | 9/2006 | Green | |
| 2006/0247013 | A1 | 11/2006 | Walker et al. | 463/20 |
| 2006/0281529 | A1 | 12/2006 | Seelig et al. | |
| 2006/0287077 | A1 | 12/2006 | Grav et al. | 463/27 |
| 2007/0015583 | A1 | 1/2007 | Tran | 463/40 |
| 2007/0045959 | A1 | 3/2007 | Soltys | |
| 2007/0054725 | A1 | 3/2007 | Morrow et al. | 463/16 |
| 2007/0057469 | A1 | 3/2007 | Grauzer et al. | 273/309 |
| 2007/0060259 | A1 | 3/2007 | Pececnik | |
| 2007/0060310 | A1 | 3/2007 | Juds et al. | |
| 2007/0060320 | A1* | 3/2007 | Kelly et al. | 463/27 |
| 2007/0060365 | A1 | 3/2007 | Tien et al. | 463/42 |
| 2007/0077990 | A1 | 4/2007 | Cuddy et al. | 463/25 |
| 2007/0111775 | A1 | 5/2007 | Yoseloff | 463/16 |
| 2007/0117608 | A1 | 5/2007 | Roper et al. | 463/16 |
| 2007/0167235 | A1 | 7/2007 | Naicker | 463/42 |
| 2007/0191102 | A1 | 8/2007 | Coliz et al. | 463/42 |
| 2007/0198418 | A1 | 8/2007 | MacDonald et al. | 705/52 |
| 2007/0208816 | A1 | 9/2007 | Baldwin et al. | |
| 2007/0232384 | A1* | 10/2007 | Pace | 463/25 |
| 2007/0235521 | A1 | 10/2007 | Mateen et al. | 235/379 |
| 2007/0243925 | A1 | 10/2007 | LeMay et al. | 463/20 |
| 2007/0243927 | A1 | 10/2007 | Soltys | 463/25 |
| 2007/0243935 | A1 | 10/2007 | Huizinga | 463/42 |
| 2007/0259709 | A1 | 11/2007 | Kelly et al. | |
| 2007/0259711 | A1 | 11/2007 | Thomas | 463/22 |
| 2007/0293303 | A1 | 12/2007 | Shayesteh | 463/25 |
| 2007/0298860 | A1 | 12/2007 | Graves et al. | |
| 2008/0004108 | A1 | 1/2008 | Klinkhammer | |
| 2008/0009344 | A1 | 1/2008 | Graham et al. | |
| 2008/0026848 | A1 | 1/2008 | Byng | |
| 2008/0038035 | A1 | 2/2008 | Shuldman et al. | |
| 2008/0045344 | A1 | 2/2008 | Schlottmann et al. | 463/25 |
| 2008/0064501 | A1 | 3/2008 | Patel | |
| 2008/0076572 | A1 | 3/2008 | Nguyen et al. | |
| 2008/0090651 | A1 | 4/2008 | Baerlocher | 463/27 |
| 2008/0096659 | A1 | 4/2008 | Kreloff et al. | |
| 2008/0108433 | A1 | 5/2008 | DiMichele et al. | |
| 2008/0113764 | A1 | 5/2008 | Soltys | 463/22 |
| 2008/0113773 | A1 | 5/2008 | Johnson et al. | |
| 2008/0113781 | A1 | 5/2008 | Soltys et al. | 463/28 |
| 2008/0119284 | A1 | 5/2008 | Luciano, Jr. et al. | |
| 2008/0146337 | A1 | 6/2008 | Halonen et al. | 463/42 |
| 2008/0214277 | A1 | 9/2008 | Kishi | |
| 2008/0261701 | A1 | 10/2008 | Lewin et al. | |
| 2008/0287197 | A1 | 11/2008 | Ruppert et al. | |
| 2008/0300046 | A1 | 12/2008 | Gagner et al. | |
| 2008/0311971 | A1 | 12/2008 | Dean | |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118006 | A1 | 5/2009 | Kelly et al. | 463/31 |
| 2009/0124329 | A1 | 5/2009 | Palmisano | |
| 2009/0163279 | A1 | 6/2009 | Hermansen et al. | |
| 2009/0170594 | A1 | 7/2009 | Delaney et al. | 463/25 |
| 2009/0176558 | A1 | 7/2009 | Englman et al. | |
| 2009/0270170 | A1 | 10/2009 | Patton | 463/36 |
| 2009/0275374 | A1 | 11/2009 | Nelson et al. | |
| 2009/0275393 | A1 | 11/2009 | Kisenwether et al. | 463/25 |
| 2009/0275394 | A1 | 11/2009 | Young et al. | 463/25 |
| 2009/0275398 | A1 | 11/2009 | Nelson | |
| 2009/0275399 | A1 | 11/2009 | Kelly et al. | 463/27 |
| 2009/0275400 | A1 | 11/2009 | Rehm et al. | 463/27 |
| 2009/0275402 | A1 | 11/2009 | Backover et al. | |
| 2009/0275407 | A1 | 11/2009 | Singh et al. | 463/31 |
| 2009/0275410 | A1 | 11/2009 | Kisenwether et al. | 463/42 |
| 2009/0275411 | A1 | 11/2009 | Kisenwether et al. | 463/42 |
| 2009/0276341 | A1 | 11/2009 | Mcmahan et al. | 705/30 |
| 2009/0276715 | A1 | 11/2009 | Arbogast et al. | |
| 2009/0307069 | A1 | 12/2009 | Meyerhofer | |
| 2009/0325708 | A9 | 12/2009 | Kerr | |
| 2010/0048291 | A1 | 2/2010 | Warkentin | |
| 2010/0125851 | A1 | 5/2010 | Singh et al. | |
| 2011/0009184 | A1 | 1/2011 | Byng | |
| 2011/0269534 | A1 | 11/2011 | Kelly et al. | |

FOREIGN PATENT DOCUMENTS

| | | | |
|---|---|---|---|
| JP | 2003-265682 | | 9/2003 |
| JP | 2004-275536 | | 10/2004 |
| KR | 2001-0084838 | | 9/2001 |
| KR | 2002-0061793 | | 7/2002 |
| KR | 2003-0091635 | | 12/2003 |
| KR | 10-0819009 | | 10/2007 |
| WO | 96/36253 | A1 | 11/1996 |
| WO | 00/22585 | A2 | 4/2000 |
| WO | 00/62880 | | 10/2000 |
| WO | 03/060846 | A2 | 7/2003 |

OTHER PUBLICATIONS

Bally Technologies, Inc., iVIEW, http://ballytech.com/systems/product.cfm?id=9, download date Nov. 6, 2007, 2 pages.

Bally TMS, "MP21—Automated Table Tracking/Features," 2 pages, Nov. 2005.

Bally TMS, "MPLite—Table Management System/Features," 2 pages, Nov. 2005.

Bravo Gaming Systems, "Casino Table Wager Analysis and Player Tracking System—Table Operations/Unique Features," accessed Apr. 11, 2005, URL=http://www.genesisgaming.com, 4 pages.

(56) References Cited

OTHER PUBLICATIONS

Bulavsky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages.
Burke, A., "Tracking the Tables," reprinted from *International Gaming & Wagering Business*, Aug. 2003, 4 pages.
Captain Morgan's Casino, Inc., "Blazing Sevens," accessed Oct. 31, 2006, URL=http://www.captainmorganscasino.com/casino-games/blazing-seven, 1 page.
Casino Software & Services, LLC., accessed Aug. 25, 2006, URL=http:/casinosoftware.com/home.html, 6 pages.
Gros, R., "All You Ever Wanted to Know About Table Games," reprinted from *Global Gaming Business*, Aug. 1, 2003, 2 pages.
Hewlett Packard Handhelds, accessed Sep. 8, 2003, URL=http:/www.shopping.hp.com/cgi-bin/hpdirect/shopping/scripts/home/store access.jsp?temp . . . , 2 pages.
Horning, S., U.S. Appl. No. 60/442,368, filed Jan. 24, 2003, 61 pages.
International Guild of Hospitality & Restaurant Managers, "Shuffle Master, Inc. (NasdaqNM:SHFL)," accessed Dec. 30, 2003, URL=http://hospitalityguide.com/Financial/Casinos/Shuffle.htm, 3 pages.
International Search Report for PCT/US2009/042443, mailed Nov. 27, 2009, 3pages.
Linksys WAP11 "Wireless Network Access Point," accessed Sep. 8, 2003, URL=http:/www.linksys.com/products/product.asp?prid=157&grid=, 4 pages.
MagTek, "Port Powered Swipe Reader," Technical Reference Manual, Manual Part No. 99875094 Rev 12, Jun. 2003, 20 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Morrow et al., U.S. Appl. No. 12/112,231, filed Apr. 30, 2008, 52 pages.
Pro, L.V., "Book Review—The Card Counter's Guide to Casino Surveillance," *Blackjack Insider Newsletter*, May 2003, #40, accessed Aug. 25, 2006, URL=http:/bjinsider.com/newsletter 40 surveillance.shtml, 5 pages.
Semtek PDA & Handheld Devices, Compaq iSwipe™ Magnetic Card Reader, accessed Sep. 8, 2003, URL=http:/www.semtek.com/products/iswipe.html, 3 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents The Ultimate Player Rating System . . . Bloodhound Sniffs Out the Pros and Cons," Dec. 31, 1997, 6 pages.
Snyder, A., "The High-Tech Eye," excerpt from *Blackjack Forum*, Spring 1997, accessed Dec. 21, 2005, from Casino Software & Services, LLC, URL=http://www.casinosoftware.com/bj forum.html.
Terdiman, D., "Who's Holding the Aces Now?", reprinted from *Wired News*, Aug. 18, 2003, 2 pages.
VideoSlotMachines.com, "Bally Gaming: Blazing Sevens," accessed Jan. 5, 2007, URL=http://www.videoslotmachines.com/bally/blazingsevens.htm, 1 page.
Ward, K., "BJ Tracking System has Players Down for the Count," *Gaming Today*, Mar. 5, 2002, accessed Dec. 21, 2005, from Casino Software & Services, LLC, URL=http://www.casinosoftware.com/gaming_today.html.
White et al., U.S. Appl. No. 12/470,353, filed May 21, 2009, 410 pages.
White et al., U.S. Appl. No., 12/470,349, filed May 21, 2009, 411 pages.
Winkler, C., "Product Spotlight: MindPlay," reprinted from *Gaming and Leisure Technology*, Fall 2003, 2 pages.
Written Opinion for PCT/US2009/042443, mailed Nov. 27, 2009, 5 pages.

* cited by examiner

METHOD AND SYSTEM FOR DYNAMICALLY AWARDING BONUS POINTS

BACKGROUND

1. Technical Field

This disclosure generally relates to the field of games and more particularly to awarding bonus points to players of games.

2. Description of the Related Art

An entertainment center such as a casino may provide players with a game payout based on rules of a game. In addition to game payouts, an entertainment center may reward bonus points under a bonus point plan to players based on, among other things, a respective player's amount of wagering. Typically, a player enrolls in a bonus point plan and receives a membership card that identifies the player as a member of the bonus point plan.

Among other things, the bonus plan creates player loyalty to the specific entertainment center and/or to a group of entertainment centers. The earnings or accrual rate of bonus points under a bonus plan may be a percentage of current wagers. For example, a bonus point plan may have an accrual rate of 0.25%, and under such a bonus point plan a player would have one bonus point after four-hundred dollars ($400) of wagers. Under a different bonus point plan, a player may accrue a bonus point based on a certain amount of money wagered by the player. For example, a player may accrue a bonus point for every ten dollars ($10) of a wager.

Typically, a player may redeem bonus points for goods and/or services offered by the entertainment center and/or at bonus plan affiliated entities. For example, a player may redeem bonus points at a restaurant of the entertainment center and/or a restaurant affiliated with the bonus plan. Some entertainment centers have bonus plans with different membership levels, which may have different bonus point accrual rates. Some entertainment centers have bonus plans with bonus point redemption rates based on membership level. For example, a "Gold member" may have to spend seventy-five (75) bonus points for a one dollar credit for the cost of a meal, whereas a "Silver member" may have to spend 100 bonus points for a one dollar credit. Some entertainment centers allow a player to convert bonus points back into game credits playable at a gaming machine. In effect, the bonus points may be free game credits. Sometimes bonus points are restricted and can only be played and not cashed out.

Often, a bonus plan may have multiple bonus point accrual rates. The rate at which a player accrues bonus points may be based on the type of game and/or the specific game title being played by the player. For example, games of skill such as poker may have a lower bonus point accrual rate than the bonus point accrual rate of pure games of chance games such as video or mechanical slot machines. An entertainment center such as a casino may wish to give a smaller amount of bonus points back to players of video poker machines than to players of video or mechanical slot machines because of differences in hold percentages for the different games. For example, a casino's hold percentage for poker games is typically very small (usually 2-3%), but the casino's hold percentage for slot machines is typically larger, between 4-10%. To create player loyalty for slot machines, bonus point accrual rates of slot machines are typically higher than bonus point accrual rates for poker games. These accrual or earning rates are preconfigured at the casino's marketing server and stay fixed throughout the year. Casinos openly market with literature and advertisements of bonus point earnings rates. Similar marketing is done for the bonus point redemption rate or formula.

Some entertainment centers may award a bonus prize to a gaming machine by reconfiguring the gaming machine itself. When this happens the gaming machine is often reconfigured into a bonus payout mode where the player may get a multiple of a normal payout from a winning combination. This bonus period will end after predetermined bonus conditions occur and the gaming machine will be put back into normal payout mode. This reconfiguration of the gaming machine from one bonus plan payout mode to another bonus plan payout mode is not a dynamical reconfiguration of the gaming machine based at least on real-time data such as player activity, player statistics, etc. Rather, the aforementioned reconfiguration is scheduled in advance and is not based on real-time events.

Entertainment centers typically implement a bonusing system employing one or more computer servers/systems. A player is normally associated with player account that is stored on the bonusing systems. The player's account may include a membership number and may have bonus points associated with the membership number. A gaming machine usually has a device such as a magnetic card reader for identifying a bonus plan member via a player's membership card. Once the player is identified, bonus points are automatically added to the player account of the player at play time or when the player logs out or removes his membership card.

There is a need for systems, methods, and devices that provide dynamic bonus plan control at remote gaming machines.

BRIEF SUMMARY

In one aspect, a method for enhancing gaming includes gathering data related to at least one of gameplay or wagering by a player of a game title over a first period of time during which the player places a number of wagers. The method further includes determining at least one statistical quantity based at least on gathered data; determining whether the determined at least one statistical quantity exceeds an extra-bonus threshold value; providing a respective payout amount to the player of the game title in accordance with rules of the game title and a respective wager for each of the number of wagers placed by the player. During the first period, the method further includes, from time to time, providing the player with bonus points in accordance with a bonus point plan, and determining an amount of an extra-award based at least on the determined at least one statistical quantity.

In another aspect, a method for enhancing gaming includes gathering data related to player activity in at least a portion of a game-entertainment center during a first period of time. The game-entertainment center has a number of gaming machines being played by a number of players during the first period. The method further includes determining at least one statistical quantity based at least on gathered data; and reconfiguring at least one of the gaming machines based at least on the at least one statistical quantity. The method further includes providing a respective player playing the reconfigured gaming machine with a number of bonus points and an amount of extra-award during a second period of time, wherein during the second period the amount of extra-award accrues at a rate different from an extra-award accrual rate for the first period.

In another embodiment, a system for enhancing game play in a game-entertainment center includes means for gathering data related to player activity in at least a portion of a game-entertainment center, the game-entertainment center having a number of gaming machines being played by a number of players during a first period of time. The system may further include means for determining at least one statistical quantity based at least on gathered data. The system may further include means for selectively reconfiguring at least one of the gaming machines based at least on the at least one statistical quantity, and means for providing a respective player playing a respective one of the at least one reconfigured gaming machine with a number of bonus points and an amount of extra-award during a second period of time, wherein during the second period the amount of extra-award accrues at a rate different from an extra-award accrual rate for the first period.

Figure 1:
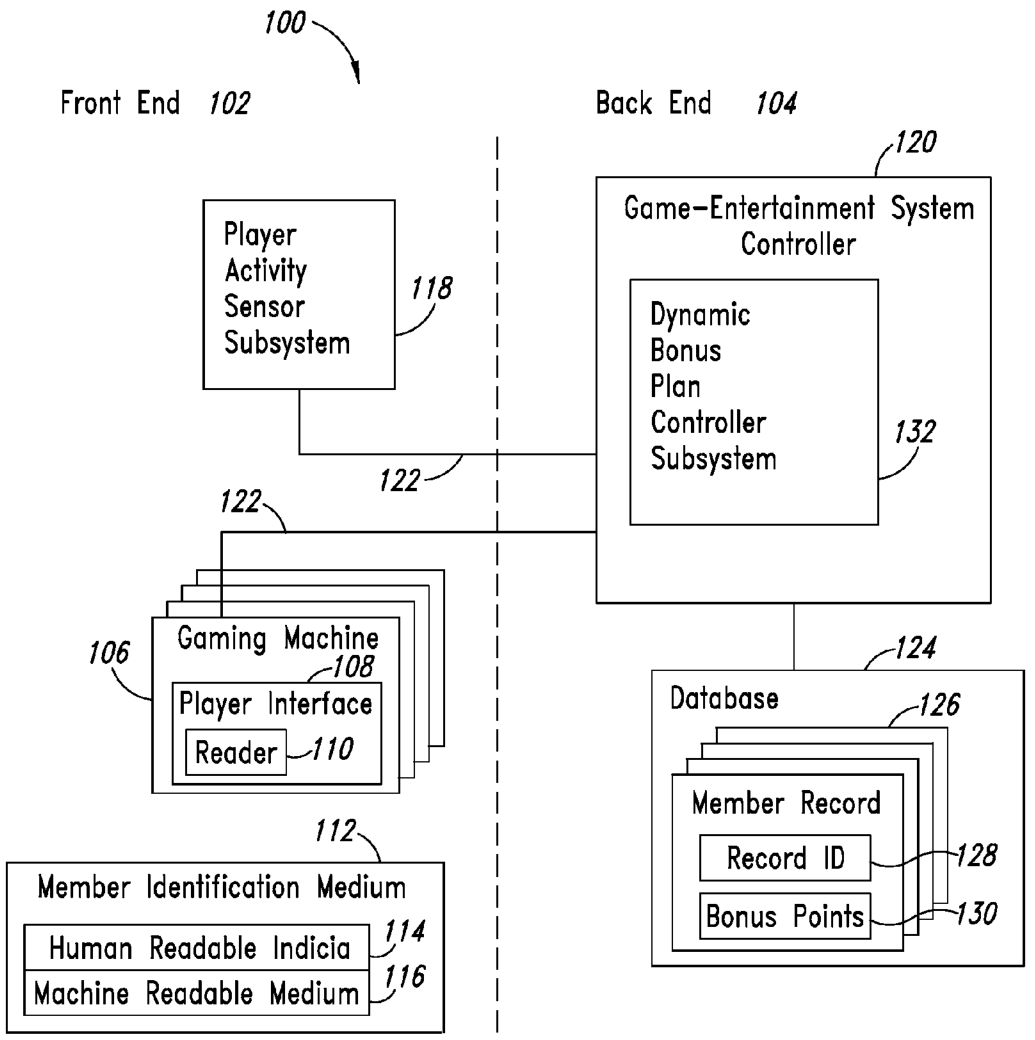
FIG. 1 is a block diagram of a game-entertainment environment, according to one non-limiting illustrated embodiment.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with servers, networks, displays, and/or with computer type devices have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Any process descriptions or blocks in flowcharts described below may be understood as representing modules, segments, or portions of code which include one or more executable instructions for implementing specific logical functions. In alternative embodiments, various logical functions, or acts may be executed out of order from that shown or discussed, including substantially concurrently or in reverse order, and/or manually, depending on the functionality involved, as would be understood by those reasonably skilled in the art.

FIG. 1 shows a game-entertainment environment 100 according to one non-limiting illustrated embodiment. The game-entertainment environment 100 may include a front end 102 and a back end 104.

The front end 102 includes gaming machines 106 that may provide various games of chance and/or of skill that may be played for entertainment and/or for monetary wagers. Games of chance may include slot machines, roulette, etc. Games of skill may include poker, blackjack, arcade games, etc. In some embodiments, the game-entertainment environment 100 may provide players with the opportunity to place monetary wagers on, among other things, the outcome of a game. In some instances such wagers may use pretend money that has no actual value outside of the game. Such may, for example, be used at charitable "casino night" type events.

In some embodiments, the gaming machines 106 may include a player interface 108 having a reader 110. The reader 110 may be configured to receive a medium such as a member identification medium 112, which may be associated with a specific player, and determine an indication of a unique member identifier from the member identification medium 112. In some embodiments, the member identification medium 112 may include human-readable indicia 114 that may be indicative of, among other things, a unique member identifier. In some embodiments, the member identification medium 112 may include machine-readable medium 116 encoding member identification information that may be indicative of a unique member identifier. The machine-readable medium 116 encoding member identification information may take a variety of forms such as, but not limited to, machine-readable symbols, e.g., bar code symbols, stack code symbols, area or matrix code symbols), and in such embodiments, the reader 110 may include one or more machine-readable symbol readers, such as scanners or imagers that read bar codes, stacked codes, and/or area or matrix codes. The gaming machine 106 and/or the reader 110 may include instructions for decoding such machine-readable symbols.

As another example, the machine-readable medium 116 encoding member identification information may include, but is not limited to, one or more wireless data provider communication devices such as radio frequency identification devices and/or one or more data storage devices such as magnetic strips. In such embodiments, the reader 110 may include one or more wireless data reader communication devices such as radio frequency identification readers and/or one or more data storage device readers such as magnetic stripe readers.

Among other things, the gaming machine 106 may provide the back end 104 with an indication of the member identification information read from the machine-readable medium 116 of a player's member identification medium 112.

In some embodiments, the gaming machines 106 may be configured to monitor gameplay of the player and to determine gameplay statistics. For example, among other statistics, a respective one of the gaming machines 106 may be configured to determine a player's average play-rate (a rate at which the player plays a round of a game at the gaming machine), determine a player's average wager over a number of rounds of a game, determine a player's gain/loss rate over a number of rounds of a game, etc. The gaming machines 106 may also provide the back end 104 with the dynamically determined gameplay statistics. Alternatively, the gaming machines 106 may provide the back end 104 with gameplay data. For example, a respective gaming machine 106 may provide game play data such as, but not limited to, an amount of a wager, an indication of a beginning or ending of a round of game play, an indication of a win or loss of a round of game play, an indication of an amount of gain or payout for a round of game play, and/or other data that may be used to determine gameplay statistics.

In some embodiments, the front end 102 may also include a player-activity sensor subsystem 118. The player-activity sensor subsystem 118 may include one or more sensors (not shown) that sense a number of persons (not shown) in at least a portion of the front end 102. The player-activity sensor subsystem 118 may collect information via images (visible, infrared, ultraviolet), radio or microwave electromagnetic radiation, and/or by detecting magnetic, inductance, or mechanical energy. The player-activity sensor subsystem 118 may provide the back end 104 with an indication of player activity in at least a portion of the front end 102. For example, the player-activity sensor subsystem 118 may provide the back end 104 with an indication of a number of players at a gaming table (not shown) such as a black-jack table and/or an indication of a number of players at the gaming machines 106.

The gaming machines 106 may be configured to provide players of respective gaming machines with bonus points which may be awarded under dynamically determined bonus point plans. A player at a respective one of the gaming machines 106 may receive bonus points in addition to regular payouts, i.e., payouts based on rules of a game being played by the player. In some embodiments, the gaming machines 106 may be dynamically reconfigurable. For example, a respective one of the gaming machines 106 may be initially configured to award a player bonus points under a current bonus plan and at a later time, the respective gaming machine 106 may be reconfigured to award a player bonus points under another or a new bonus plan. The reconfiguration of the respective gaming machine may be dynamic reconfiguration based at least in part on real-time data gathered by various gaming machines 106 and/or based at least on real-time data gathered by the player-activity sensor subsystem 118. In addition, a respective one of the gaming machines 106 may be initially configured to provide sessions of game play for a first game title such as poker and at a later time, the respective gaming machine 106 may be reconfigured to provide sessions of game play for a second game title such as blackjack, or slots, etc. Furthermore, the gaming machines 106 may be reconfigurable to provide sessions of game play of a game title based at least on different sets of game title parameters which may control, among other things, the rate of play of the respective gaming machines 106.

The back end 104 may include a game-entertainment system controller 120 which may be communicatively coupled to the game systems 106 and to the player-activity sensor subsystem 118 by communication links 122. The communication links 122 may be a network such as a wide area network (WAN), a local area network (LAN), a wire, wireless, or combination thereof, network. The game-entertainment system controller 120 may be embodied in a computing system, distributed computing system, one or more servers, etc.

The game-entertainment system controller 120 may be communicatively coupled to a database 124. The database 124 may store, among other things, member records 126. A respective one of the member records 126 may be associated with a specific player of the game-entertainment environment 100. Among other things, a respective one of the member records 126 may include the name of the player associated with the respective member record 126, a record identifier 128 for each respective member record 126, respective player data, and awarded bonus points 130. Among other things, player data for a specific player may include, but is not limited to, types of games played by the player, frequency of visits to the game-entertainment environment 100 by the player, average duration of the player's visits to the game-entertainment environment 100, dates of visits to the game-entertainment environment 100, and wagering information such as average wager, maximum wager, average of the aggregate of wagers placed during a visit to the game-entertainment environment 100 by the player, average of the aggregate of amount of money won/lost during a real or a virtual visit to the game-entertainment environment 100 by the player, total amount of money won/lost by the player, etc.

In some embodiments, the game-entertainment environment 100 may be accessed by a player via a WAN or Internet or World Wide Web. The player may "visit" a virtual game-entertainment environment and play virtual games or virtual gaming machines. Player statistics and bonus points may be accumulated for "visits" in the virtual game-entertainment environment.

The game-entertainment system controller 120 may include a dynamic bonus plan controller subsystem 132. The dynamic bonus plan controller subsystem 132 may receive data from the front end 102 via the communication links 122. The dynamic bonus plan controller subsystem 132 may determine new bonus plans, which may be provided to, among other things, the gaming machines 106, based at least in part on the data from the front end 102 and the data may be real-time data. Data provided to the dynamic bonus plan controller subsystem 132 may include, but is not limited to, player activity data from the player-activity sensor subsystem 118, gameplay data and/or gameplay statistics from the gaming machines 106.

In addition, the dynamic bonus plan controller subsystem 132 may determine to reconfigure a respective one of the gaming machines 106. The gaming machine 106 that currently provides sessions of game play for a first game title such as poker may be reconfigured to provide sessions of game play for a second game title such as blackjack, or slots, etc. Furthermore, the dynamic bonus plan controller subsystem 132 may determine to reconfigure a respective one of the gaming machines 106 from providing sessions of game play for a first game title based at least on a first set of game title parameters to providing sessions of game play for the first game title based at least on a second set of game title parameters. For example, a change in game title parameters may increase a play rate, i.e., number of games played per unit time, for a gaming machine by decreasing a length of time for playing a game.

In some embodiments, the dynamic bonus plan controller subsystem 132 may determine a new bonus plan for a respective one of the gaming machines 106 based at least in part on a member record 126.

In some embodiments, a player enrolled in a bonus point plan of the game-entertainment environment 100 may have received a member identification medium 112. The player may provide the member identification medium 112 to the reader 110 of a player interface 108 of a respective gaming machine 106. The reader 110 may read information indicative of member identification information from the machine-readable medium 116 of the player's member identification medium 112. The gaming machine 106 may award the player with bonus points under a current bonus point plan. The gaming machine 106 may provide the game-entertainment system controller 120 of the back end 104 with an indication of the member identification information. The gaming machine 106 may provide the game-entertainment system controller 120 with information indicative of a number of awarded bonus points awarded to the player. Among other things, the game-entertainment system controller 120 may determine a record identifier 128 based at least in part on the indication of the member identification information. Based at least in part on the record identifier 128, the game-entertainment system controller 120 may update the member record 126 associated with the player.

Figure 2:
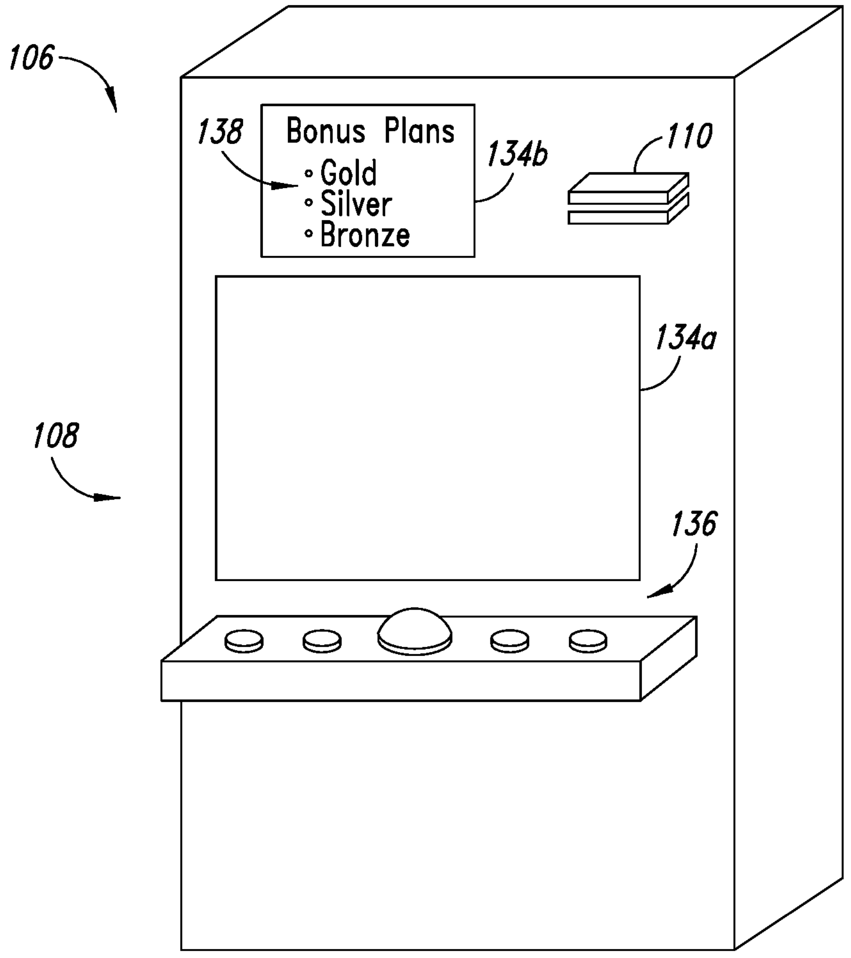
FIG. 2 is an isometric view of a gaming machine, according to one non-limiting illustrated embodiment.

FIG. 2 shows a gaming machine 106 according to one non-limiting embodiment. The gaming machine 106 includes the player interface 108, which may include one or more display devices 134*a*, 134*b* and one or more player input devices 136. Player input devices 136 may include various buttons, keys, a track wheel, a track ball, a joy stick, a key pad, a number pad, a touch pad, a touch screen, user selectable icons, etc.

In some embodiments, the display devices 134*a*, 134*b* may take a variety of forms, for example cathode ray tube (CRT) displays, or flat panel displays such as liquid crystal (LCD) displays, liquid crystal on silicon (LCoS) displays, plasma displays, digital light processing (DLP) displays, other projection type of displays, and touch sensitive displays.

The display device 134*a* may display, among other things, a virtual game to a player, and the display device 134*b* may display, among other things, game information, player information such as total number of bonus points awarded to the player, and/or bonus information such as number of bonus points awarded to the player by the gaming machine 106. The display device 134*b* may display, among other things, bonus plan information and player information.

A player may use the player interface 108 to, among other things, select a game or virtual game, control and play a game or virtual game, select a bonus plan, and accept/decline a configuration change to the gaming machine such as a change to a bonus plan, e.g., from a current bonus plan to a different bonus plan, a change of a current game title to a different game title, a change in operation of a current game title, and/or a change in wager limits, e.g., increasing/decreasing a minimum and/or maximum wager amount.

The player interface 108 may include one or more player selectable icons which may be displayed by the display device 134*b*. For example, the player interface 108 may include player selectable icons (not shown) that allow the player to select a type of game to be played on the gaming machine 106. Also for example, the player interface 108 may include player selectable icons 138 that allow the player to select a bonus plan. In some embodiments, the display device 134*b* may be touch sensitive, and the player may select one of the player selectable icons 138 by touching the display device 134*b*. In some embodiments, the player may select one of the player selectable icons 138 using one or more of the user input devices 132.

The gaming machine 106 also includes the reader 110. The reader 110 may take a variety of forms including, but not limited to, one or more magnetic stripe readers operable to read information indicative of player identification information encoded into one or more magnetic stripes. Alternatively, or additionally, the reader 110 may take the form of one or more optical machine-readable symbol readers operable to read information indicative of player identification information encoded into one or more machine-readable symbols (e.g., barcode symbols, stacked code symbols, area or matrix code symbols, etc.). In addition, the reader 110 may take the form of one or more RFID readers or interrogators operable to read information indicative of member identification information encoded into one or more RFID carriers (e.g., tags or cards).

Figure 3:
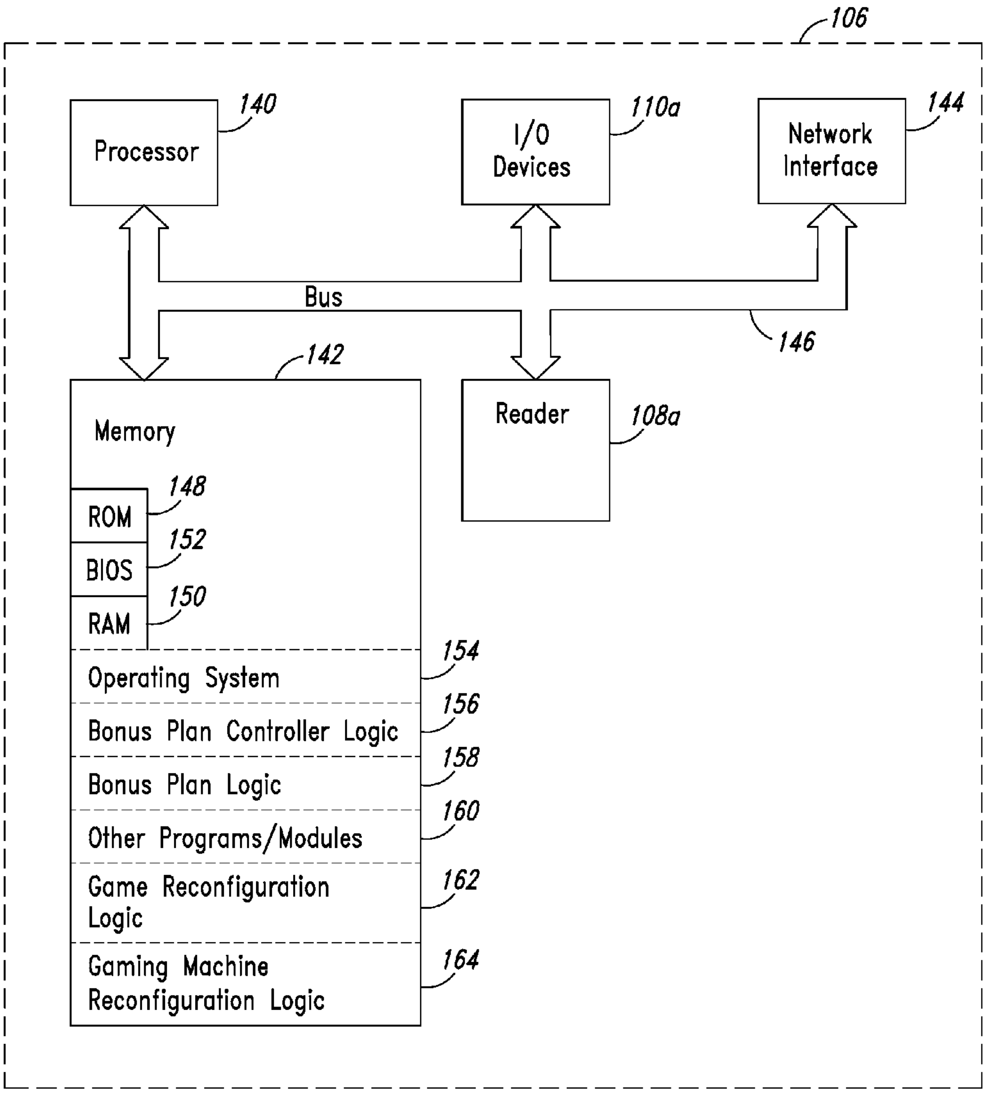
FIG. 3 is a schematic diagram of the gaming machine of FIG. 2, according to one non-limiting illustrated embodiment.

FIG. 3 shows a gaming machine 106 according to another non-limiting illustrated embodiment. The gaming machine 106 includes the reader 110 and the player interface 108, which were previously discussed and which, for the sake of brevity, will not be discussed in detail below.

The gaming machine 106 includes a processor 140, a memory 142, and network interface 144, which are communicatively coupled by one or more buses 146. The processor 140 may be a device for executing software, particularly that stored in the memory 142. The processor 140 may be a custom made or commercially available processor, a central processing unit (CPU), a semiconductor based microprocessor (in the form of a microchip or chip set), or generally any device for executing software instructions.

The memory 142 is communicatively coupled to the processor 140 via bus 146. The bus 146 can employ any known bus structures or architectures, including a memory bus with memory controller, a peripheral bus, and a local bus.

The memory 142 includes read-only memory ("ROM") 148 and random access memory ("RAM") 150. A basic input/output system ("BIOS") 152, which can form part of the ROM 148, contains basic routines that help transfer information between elements within the game system 106, such as during start-up. The RAM 150 may include dynamic random-access memory (DRAM), static random-access memory (SRAM), synchronous dynamic random-access memory (SDRAM), flash RAM, etc.

The memory 142 may store one or more logic modules or logic routines, each of which may comprise an ordered listing of executable instructions for implementing logical functions. In particular, the memory 142 includes an operating system 154 and local bonus plan controller 156. The execution of the operating system 154 by the processor 140 essentially controls the execution of other logic, such as bonus plan controller logic 156 and provides scheduling, input-output control, file and data management, memory management, and communication control and related services.

The bonus plan controller logic 156 may include various logic modules or logic routines, each of which may comprise an ordered listing of executable instructions for implementing logical functions. In particular, the bonus plan controller logic 156 may include logic for, among other things, gathering player data, analyzing player data based on various statistical algorithms, and providing the real-time data and/or real-time player statistics to the game-entertainment system controller 120. In some embodiments, the bonus plan controller logic 156 may include logic for, among other things, gathering gameplay data, analyzing gameplay data based on various statistical algorithms, and providing the real-time gameplay data and/or real-time gameplay statistics to the game-entertainment system controller 120. Among other things, the bonus plan controller logic 156 may include logic for interfacing with the player via, for example, selectable icons 138. Among other things, the bonus plan controller logic 156 may include logic for dynamic control of the bonus plan logic 158.

The bonus plan logic 158 may include various logic modules or logic routines, each of which may comprise an ordered listing of executable instructions for implementing logical functions. In particular, the bonus plan logic 158 may include logic for, among other things, determining a number of bonus points to award the player under a current bonus plan. In some embodiments, the bonus plan logic 158 may award bonus points and/or other awards based at least on a set of bonus plan parameters.

The memory 142 also includes other programs and/or modules 160 for implementing logical functions. In some embodiments, the other programs and/or modules 160 may include a second bonus plan logic and may include a second set of bonus plan parameters. In some embodiments, the other programs and/or modules 160 may also include one or more modules/routines of game logic and one or more sets of game title parameters.

The bonus plan controller logic 156 may dynamically reconfigure the gaming machine 106 by causing the processor 140 to cease the execution of bonus plan logic 158 and to commence the execution of another bonus plan logic such as the second bonus plan logic. In some embodiments, the bonus plan controller logic 156 dynamically reconfigures the gaming machine 106 by causing the processor 140 to execute the bonus plan logic 158 using a different set of bonus plan parameters.

The memory 142 also includes game reconfiguration logic 162. The game reconfiguration logic 162 may include various modules or routines or logic, each of which may comprise an ordered listing of executable instructions for implementing logical functions. In particular, the game reconfiguration logic 162 may include logic for, among other things, reconfiguring a game title and/or switching a game title provided by the gaming machine. For example, the game reconfiguration logic 162 may reconfigure the gaming machine from providing sessions of a first game by implementing a first game title logic to providing sessions of a second game by implementing a second game title logic. As another example, the game reconfiguration logic 162 may reconfigure the gaming machine from implementing a game title logic using a first set of game title parameters to implementing the game title logic using a second set of game title parameters.

The other programs and/or modules 160 may further include at least one module/routine of a second game title logic and at least one associated set of second game title parameters. The processor 140 may execute modules/routines of a game title logic module/routine and an associated set of game title parameters to, among other things, provide sessions of a first game. The game reconfiguration logic 162 may cause the processor 140 to execute modules/routines of a second game title logic to provide, among other things, sessions of a second game. Similarly, the game reconfiguration logic 162 may cause the processor 140 to execute modules/routines of a game logic module/routine using a first set of game title parameters, and then cause the processor 140 to execute modules/routines of the game logic using a second set of game title parameters.

In some embodiments, the memory 142 may include gaming machine reconfiguration logic 164, which may comprise logic modules or logic routines. The memory 142 may include, among other things, the bonus plan controller logic 156 and the game reconfiguration logic 162.

In some embodiments, the gaming machine reconfiguration logic 164 the bonus plan controller logic 156 and/or the game reconfiguration logic 162 may reconfigure the gaming machine 106 based at least on an indication of machine reconfiguration provided by the game-entertainment system controller 120. The indication of machine reconfiguration may be indicative of a reconfiguration of a bonus plan, bonus plans, a game title, or game titles.

The I/O devices 110 may include user interface devices such as a display and various user selections devices such as buttons, keys, a track wheel, a track ball, a joy stick, a key pad, a number pad, a touch pad, a touch screen, a user selectable icons, etc.

The network interface 144 may include network cards and/or wireless communication devices that provide a communication link 118 with the game-entertainment system controller 120.

In some embodiments, the gaming machine reconfiguration logic 162 or a portion of the gaming machine reconfiguration logic 162 may be implemented in firmware that is stored in a memory and that is executed by a suitable instruction execution system. If implemented in hardware, as in an alternative embodiment, the gaming machine reconfiguration logic 162 and/or various logic modules or logic routines of the gaming machine reconfiguration logic 162 may be implemented with any or a combination of the following technologies: a discrete logic circuit(s) having logic gates for implementing logic functions on data signals, an application specific integrated circuit (ASIC) having appropriate combinational logic gates, a programmable gate array(s) (PGA), a field programmable gate array (FPGA), etc.

Figure 4:
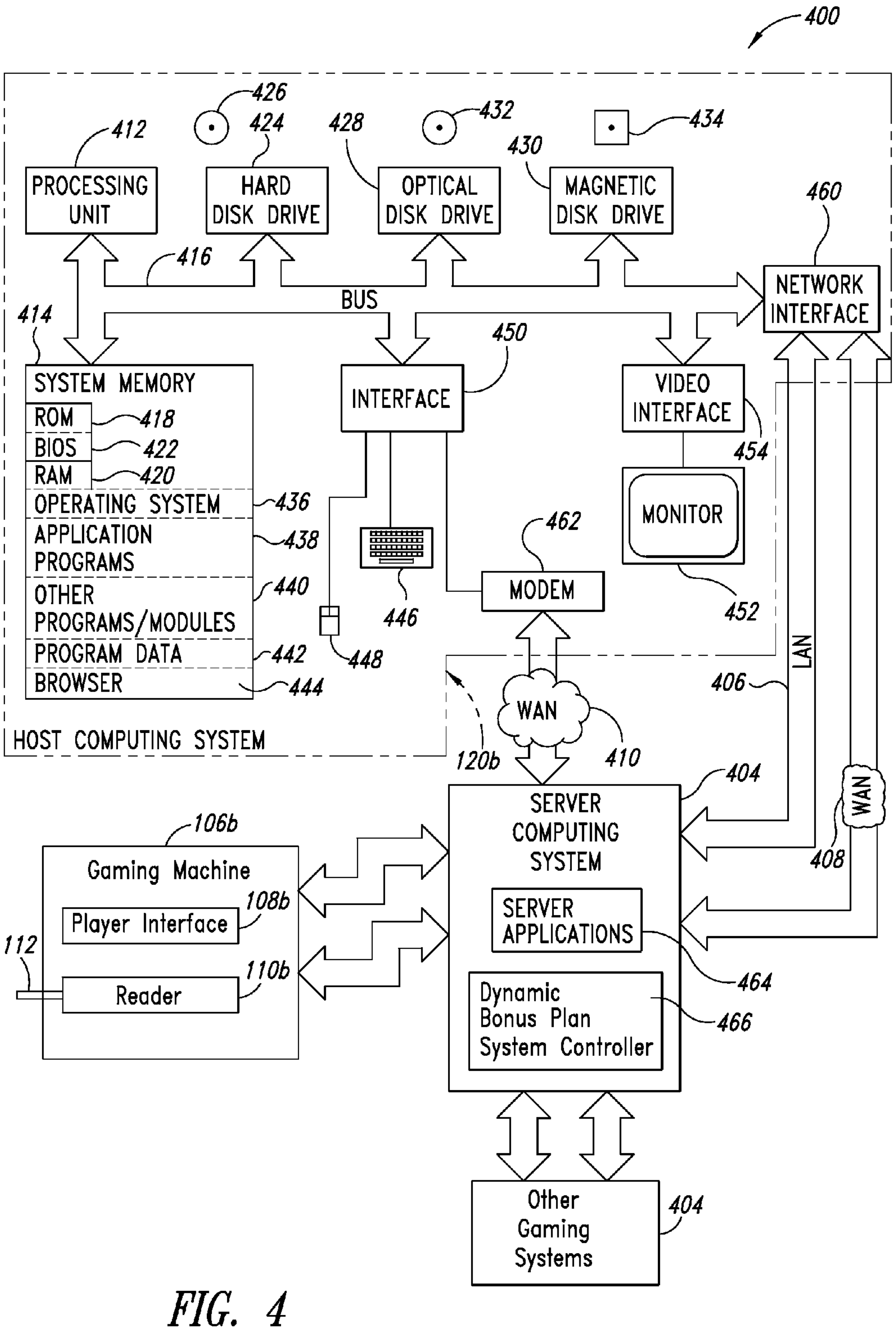
FIG. 4 is schematic diagram of a gaming-entertainment system environment, according to one non-limiting embodiment.

FIG. 4 and the following discussion provide a brief, general description of a suitable gaming-entertainment system environment 400 in which the various illustrated embodiments may be implemented. Although not required, the embodiments will be described in the general context of computer-executable instructions, such as program application modules, objects, or macros being executed by a computer. Those skilled in the relevant art will appreciate that the illustrated embodiments as well as other embodiments may be practiced with other computer system configurations, including handheld devices, multiprocessor systems, microprocessor-based or programmable consumer electronics, personal computers ("PCs"), network PCs, mini computers, mainframe computers, and the like. The embodiments may be practiced in distributed computing environments where tasks or modules are performed by remote processing devices, which are linked through a communications network. In a distributed computing environment, program modules may be located in both local and remote memory storage devices.

FIG. 4 shows the gaming-entertainment system environment 400 comprising one or more gaming machines 106 having player interface 108, one or more player-activity sensor subsystems 118, one or more game-entertainment system controllers 120, other gaming systems 404, and/or server computing systems 406 coupled by one or more communications channels, for example one or more local area networks (LANs) 408 or wide area networks (WANs) 410. The gaming-entertainment system environment 400 may employ other computers, such as conventional personal computers, where the size or scale of the system allows.

The game-entertainment system controller 120 may take the form of a conventional mainframe or mini-computer that includes a processing unit 412, a system memory 414 and a system bus 416 that couples various system components including the system memory 414 to the processing unit 412. The game-entertainment system controller 120 will at times be referred to in the singular herein, but this is not intended to limit the embodiments to a single computing system since in typical embodiments, there will be more than one computing system or other device involved. Non-limiting examples of commercially available systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processing unit 412 may be any logic processing unit, such as one or more central processing units (CPUs), digital signal processors (DSPs), application-specific integrated circuits (ASICs), field programmable gate arrays (FPGAs), etc. Unless described otherwise, the construction and operation of the various blocks shown in FIG. 4 are of conventional design. As a result, such blocks need not be described in further detail herein, as they will be understood by those skilled in the relevant art.

The system bus 416 can employ any known bus structures or architectures, including a memory bus with memory controller, a peripheral bus, and a local bus. The system memory 414 includes read-only memory ("ROM") 418 and random access memory ("RAM") 420. A basic input/output system ("BIOS") 422, which can form part of the ROM 418, contains basic routines that help transfer information between elements within the game-entertainment system controller 120, such as during start-up.

The game-entertainment system controller 120 also includes a hard disk drive 424 for reading from and writing to a hard disk 426, and an optical disk drive 428 and a magnetic disk drive 430 for reading from and writing to removable optical disks 432 and magnetic disks 434, respectively. The optical disk 432 can be a CD-ROM, while the magnetic disk 434 can be a magnetic floppy disk or diskette. The hard disk drive 424, optical disk drive 428 and magnetic disk drive 430 communicate with the processing unit 412 via the system bus 416. The hard disk drive 424, optical disk drive 428 and magnetic disk drive 430 may include interfaces or controllers (not shown) coupled between such drives and the system bus 416, as is known by those skilled in the relevant art. The drives 424, 428 and 430, and their associated computer-readable media 426, 432, 434, provide nonvolatile storage of computer readable instructions, data structures, program modules and other data for the game-entertainment system controller 120. Although the depicted game-entertainment system controller 120 employs hard disk 424, optical disk 428 and magnetic disk 430, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 414, such as an operating system 436, one or more application programs 438, other programs or modules 440 and program data 442. The system memory 414 may also include communications programs, for example, player access logic 444. The player access logic 444 may allow a player to access a virtual game-entertainment environment via a communication network. For example, in some embodiments, a player may use a Web client such as a commercially available browser. Non-limiting examples of commercially available browsers include Mozilla Firefox developed by Mozilla Foundation based in Mountain View, Calif., USA, Safari developed by Apple Inc. based in Cupertino, Calif., USA., and Internet Explore by Microsoft Corp. based in Redmond, Wash., USA.

While shown in FIG. 4 as being stored in the system memory 414, the operating system 436, application programs 438, other programs/modules 440, program data 442 and player access logic 444 can be stored on the hard disk 426 of the hard disk drive 424, the optical disk 432 of the optical disk drive 428 and/or the magnetic disk 434 of the magnetic disk drive 430.

An operator, such as casino personnel, can enter commands and information into the game-entertainment system controller 120 through input devices such as a touch screen or keyboard 446 and/or a pointing device such as a mouse 448. Other input devices can include a microphone, joystick, game pad, tablet, scanner, etc. These and other input devices are connected to the processing unit 412 through an interface 450 such as a serial port interface that couples to the system bus 416, although other interfaces such as a parallel port, a game port, a wireless interface, or a universal serial bus ("USB") can be used. A monitor 452 or other display device is coupled to the system bus 416 via a video interface 454, such as a video adapter. The game-entertainment system controller 120 can include other output devices, such as speakers, printers, etc.

The game-entertainment system controller 120 can operate in a networked environment using logical connections to one or more remote computers and/or devices, for example, the server computing system 406. The server computing system 406 can be another personal computer, a server, another type of computer, or a collection of more than one computer communicatively linked together and typically includes many or all of the elements described above for the game-entertainment system controller 120. The server computing system 406 is logically connected to one or more of the game-entertainment system controllers 120 under any known method of permitting computers to communicate, for example, through one or more LANs 408 and/or WANs 410 such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a LAN networking environment, the game-entertainment system controller 120 is connected to the LAN 408 through an adapter or network interface 460 (communicatively linked to the system bus 416). When used in a WAN networking environment, the game-entertainment system controller 120 may include a modem 462 or other device, such as the network interface 460, for establishing communications over the WAN 410. The modem 462 is shown in FIG. 4 as communicatively linked between the interface 450 and the WAN 410.

In a networked environment, program modules, application programs, data, or portions thereof, can be stored in the server computing system 406. In the depicted embodiment, the game-entertainment system controller 120 is communicatively linked to the server computing system 406 through the LANs 408 and/or WAN 410, for example with TCP/IP middle layer network protocols. However, other similar network protocol layers are used in other embodiments, such as User Datagram Protocol ("UDP"). Those skilled in the relevant art will readily recognize that the network connections shown in FIG. 4 are only some examples of establishing communication links between computers, and other links may be used, including wireless links.

The server computing system 406 includes server applications 464 for the routing of instructions, programs, data and agents between the gaming machine 106, player-activity sensor subsystem 118, game-entertainment system controller 120, and/or other gaming systems 404. For example the server applications 464 may include conventional server applications such as WINDOWS NT 4.0 Server, and/or WINDOWS 2000 Server, available from Microsoft Corporation in Redmond, Wash. Additionally, or alternatively, the server applications 464 can include any of a number of commercially available Web servers, such as INTERNET INFORMATION SERVICE from Microsoft Corporation and/or IPLANET from Netscape/America On Line (AOL).

The server computing system 406 may also include a dynamic bonus plan system controller 466. Among other things, the dynamic bonus plan system controller 466 may comprise an ordered listing of executable instructions for implementing logical functions. In particular, the dynamic bonus plan system controller 466 may include logic for, among other things, selecting a bonus plan from a plurality of bonus plans based at least on player activity at various portions of the front end 102, real-time player statistics, real-time player data, real-time gameplay data, real-time gameplay statistics, etc. Among other things, the dynamic bonus plan system controller subsystem 466 may include logic for dynamically providing one or more gaming machines 106 and/or one or more other gaming systems 404 with at least one respective new and/or second bonus plan logic such that the respective gaming machines 106 and/or respective other gaming systems 404 may be reconfigured to award respective players bonus points under the respective new/second bonus plan logic.

The gaming machine 106 and/or the player interface 108 may include one or more controllers, memories and may store and execute one or more applications for providing information to, and collecting information from, players of the gaming machine 106. For example, a player may select payout or house odds and/or house advantage via the player interface 108, for example, via a graphical user interface (GUI). The player interface 108 may provide the player with a selection of predefined payout or house odds and/or house advantages, or may receive payout or house odds and/or house advantage defined by the player. The player interface 108 may permit the player to select from a variety of bonus plans.

Additionally, the player interface 108 may include instructions for handling security such as password or other access protection and communications encryption. The player interface 108 can also provide statistics (win, loss, time, etc.) to the players and/or game-entertainment system controller 120 via the server computing system 406. The statistics may be provided in real-time or almost real-time. Further, the player interface 108 may allow the player to request drinks, food, and/or services. Other information may include one or more of player identification data, preference data, statistical data for the particular player and/or other players, account numbers, account balances, maximum and/or minimum wagers, etc.

The other gaming systems 404 may include game stations (not shown) such as, but not limited to, one or more poker tables, one or more blackjack tables, roulette tables, keno tables, craps tables, etc. The other gaming systems 404 may include one or more sensors, detectors, input devices, output devices, actuators, and/or controllers such as programmed a microprocessor, DSP, ASIC and/or Field Programmable Gate Array (FPGA) or the like. The controllers may execute one or more gaming applications. The gaming applications can include instructions for acquiring wagering and gaming event information from the live gaming at a gaming table (not shown). The other gaming systems 404 may collect information via images (visible, infrared, ultraviolet), radio or microwave electromagnetic radiation, and/or by detecting magnetic, inductance, or mechanical energy. The other gaming systems 404 may, for example, employ optical machine-readable symbol readers, operable to read non-standard playing card markings from the playing cards, and/or identifiers from chips and/or player identification media such as casino club cards. Such markings or identifiers may, for example, take the form of machine-readable symbols such as barcode, matrix or area code, or stacked code symbols. Such optical machine-readable symbol readers may take the form of a scanner or an imager. The other gaming systems 404 may, for example, employ sensors operable to read standard playing card markings (e.g., rank, suit, pips). The other gaming systems 404 may, for example, employ one or more magnetic strip readers or inductive sensors to read magnetic stripes or other indicia carried on or in the playing cards, chips and/or player identification media. The other gaming systems 404 may, for example, employ one or more radio frequency readers, for example a radio frequency identification (RFID) interrogator where the playing cards, chips or player identification media carry RFID tags or circuits.

The gaming applications can also include instructions for processing, at least partially, the acquired wagering and gaming event information, for example, identifying a respective position and a respective amount of each wager at a gaming station and/or a respective value of each hand of playing cards at a gaming station. The gaming applications may include statistical packages for producing statistical information regarding the play at a particular gaming station, the performance of one or more players including indications of skill level, the performance of a dealer (not shown), and/or game operator. The gaming applications can also include instructions for providing a video feed and/or simulation of some or all of a number of participant positions at one or more gaming stations. Gaming applications may determine, track, monitor or otherwise process outcomes of games, amounts of wagers, average wager, player identity information, complimentary benefits information ("comps"), player performance data including indications of player skill or theoretical advantage or use of counting schemes, dealer performance data, chip tray accounting information, playing card sequences, etc. Some suitable applications are described in one or more of commonly assigned U.S. Patent Application Ser. No. 60/442, 368, filed Apr. 21, 1999; U.S. Pat. No. 6,460,848, issued Oct. 8, 2002; U.S. Pat. No. 6,652,379, issued Nov. 25, 2003; U.S. Pat. No. 6,685,568, issued Feb. 3, 2004; U.S. Patent Publication No. 2002-0187821 A, published Dec.12, 2002; U.S. Pat. No. 6,638,161, issued Oct. 28, 2003; and U.S. Patent Publication No. 2004-0259618 A, published_Dec. 23, 2004.

The player-activity sensor subsystem 118 may include one or more sensors (not shown) that sense a number of persons (not shown) in at least a portion of the front end 102. The player-activity sensor subsystem 118 may collect information via images (visible, infrared, ultraviolet), radio or microwave electromagnetic radiation, and/or by detecting magnetic, inductance, or mechanical energy. The player-activity sensor subsystem 118 may provide information to the game-entertainment system controller 120 via the server computing system 406.

Casino Like Game-Entertainment Environment

A casino may include one or more download and reconfiguration servers, which may cause a gaming machine to be reconfigured. In some embodiments, the download and reconfiguration server(s) may be capable of, among other things, major and/or minor changes to gaming machines providing various games. One exemplary change to a gaming machine may be to change a game title logic that is currently being implemented on the gaming machine to provide a respective game such that after the change a round of the game takes less time than before the change. For example, a game title logic for a video slot game may be changed such that a reel spin rate for the video slot game is faster than normal. By increasing the reel spin rate, the video slot game plays faster, and consequently, the gaming machine providing the video slot game may receive more wagers per unit time than it would if the video slot game played slower.

For example, a normal game may allow 10 games per minute to be played in normal mode (or a game every 6 seconds). If various timing events or onscreen events are modified then the games could be made to play at a rate of 12 games per minute (or one game every 5 seconds) on average.

A casino may decide to speed up game play to maximize potential earnings from gaming machines based at least in part on player activity in a portion of the casino. For example, if every gaming machine is already in use by at least one player on Saturday night, the casino may make everything play a little faster to maximize wagering that evening. If an average wager per player is $1 per play, then in the new configuration (e.g., speed up from 10 games per minute to 12 games per minute) then the wagering is $12 per minute versus the original $10 per minute. However, a player may go through his or her money faster than normal if the gaming machine is in a speed-up mode such that the gaming machine plays faster than if the gaming were in a normal. This may be beneficial for the casino, but the overall experience for the player will be diminished.

Dynamic Bonusing

The casino may provide a player with dynamic bonusing to, among other things, enhance the overall experience of the player. To help illustrate dynamic bonusing and how dynamic bonusing may affect a player's behavior and player's appreciation of the overall experience, various terms and examples are provided below.

EXAMPLE 1

Gaming Machine in Non-Tournament Mode

For a particular gaming machine having a hold of x %, i.e., statistically the slot gaming machine retains on average x % of all wagers, the expected casino gain rate (ECGR) may be given as:

*ECGR*=(Avg. wager)*(Avg. Hold of Machine)*(Avg. Play rate).

For example, if Avg. wager=$1.00, Avg. Hold of Machine=10% (theoretical or calculated) (lifetime or this session), and Avg. Play rate=10 games/minute, then on average the casino will collect $1 from a player per minute of play.

It should be noted that the Avg. Hold of Machine may be calculated from actual data or the theoretical percentage that the game combo is programmed to. In some embodiments, the Average Hold of Machine can be calculated for a respective gaming machine based at least on (1) information gathered from the respective gaming machine over a recent series of games played at the respective gaming machine or (2) historical information gathered from the respective gaming machine over an extended period of time. In some embodiments, the Average Hold of Machine can be calculated for a respective gaming machine or a group of gaming machines based at least on (1) information gathered from the group of gaming machines over a recent series of games played at the group of gaming machines or (2) historical information gathered from the group of gaming machines over an extended period of time. In some embodiments, the Average Hold of Machine can be calculated for a respective gaming machines or for a group of gaming machine based at least on a specific game combo and/or all machines that use this game combo, etc.

The casino gain amount (CGA), i.e., the amount the casino gains, for a particular gaming machine is the actual hold of the particular gaming machine, which is the difference between the amount collected (Actual Wagers) and the amount paid out (Player Game Wins);

*CGA*=Actual Wagers−Player Game Wins.

While the player plays the particular gaming machine, the casino will, on the average, collect more than it pays out. The casino's collection rate (CasinoGain Rate) may be given by; CasinoGain Rate=CGA/player's session period, i.e., the length of time the player plays the gaming machine.

A typical bonus point (BP) accrual for the player over the same time is calculated by the following:

Bonus Points accrued per unit time=(Wagers per unit time)*(BP Accrual Rate)

For example:

if wagers per unit time=$10/minute and BP Accrual Rate=0.2% of wagers, then

Bonus Point accrual=($10/min)*(0.2%)=2 cents of bonus point accrued per min.

Thus, the casino collects $1/minute from the player and gives back to the player 2 cents/minute in bonus points or $0.98 cents/minute of net hold/minute for the casino.

When the download and configuration server reconfigures the gaming machine, these numbers are affected. For example if a player is offered a competitive play tournament on his primary base game, that player will often speed up their rate of play per unit time to try to get the best tournament score possible. They will increase their rate of play significantly over normal play. An example of how the numbers would be affected under such circumstances is provided below:

EXAMPLE 2

Gaming Machine in Tournament Mode

Consider the same scenario, except the gaming machine is in tournament mode, which entices faster play by the player.

Avg wager=$1.00

Avg. Hold=10%

Avg Play rate=12 games/minute (faster than above)

The expected casino gain rate is: ECGR=$1.00*10%*12 games/min=$1.20 per minute of play.

The bonus point accrual for the player during this same time is calculated by the following:

Bonus Points accrued per unit time=(Wagers per unit time)*(BP Accrual Rate).

Bonus Point accrual=($12/min)*(0.2%)=2.4 cents of bonus point accrued.

So to compare the game in normal play rate mode of 10 games/min to a gaming machine reconfigured into a pay to play tournament mode that achieves 12 games/minute:

Normal Mode:

$1.00 given to casino by player per minute $0.02 bonus points given back to player per minute Or $0.98 cents net gain to casino per minute.

Tournament Mode:

$1.20 given to casino by player per minute $0.024 bonus points give back to player per minute Or $1.176 net gain to casino per minute.

When the gaming machine is in tournament mode, the player goes through his/her money much faster than normal for a very small incremental return in bonus points. The difference in the bonus point accrual rate, 0.4 cents or $0.004 dollars more does not provide the player with an incentive to play at the faster play rate. Conversely, the incremental net win/minute for the casino is ($1.176–$0.98)/minute or $0.196/min or approx. 20 cents per minute more than normal play rate mode. The difference in the net gain for the casino will be referred to as CasinoExcessGain.

Given that the player's appreciation of the overall gaming experience may diminish if the player loses his/her money at a faster rate than normal, the casino may decide to offer the player a more compelling prize opportunity to justify such a greater loss rate to the casino. Casino Gain Rate is the opposite of Player Loss Rate. PlayerExcessLoss is the opposite of CasinoExcessGain. It is the extra rate of lost money per unit of time that the player gave to the casino while the game is in reconfigured mode versus normal mode.

When a player plays a gaming machine at a play rate that is higher than a normal play rate for the gaming machine, the casino may offer the player a higher bonus point accrual rate to compensate for the faster loss rate of the player. The player will get the same number of games in normal play or in tournament play, but the player may go through his/her money more quickly than normal and may have to leave the gaming machine earlier.

Many players come to the casino with a fixed amount of money to spend and the players may expect a certain amount of entertainment or time on a respective gaming machine. If the gaming machines are reconfigured to a play rate that is faster than a normal play rate, the total entertainment value proposition for the players may be reduced because the players may have higher loss rates. The players do not have a motivation to play gaming machines at a faster play rate than normal, even though the players have the same opportunity to win or number of tries to win regardless of the play rate of the gaming machines.

In some situations, the casino may want players to wager their money faster then normal, especially when the casino is busy such as weekend days and nights. By having a player wager his/her money faster than normal, the time period for a session of game play at a gaming machine may be reduced. Consequently, the time period that another player waits for the gaming machine to become available is reduced.

Typically, gaming machines have a minimum wager size. To increase player turnover at gaming machines, the casino may decide to reconfigure the gaming machines and increase the minimum wager size of the gaming machines. However in the reconfigured mode, a player may get fewer games for their money and may have a lower appreciation of the overall entertainment than in non-reconfigured mode.

In one embodiment, a dynamic bonusing system may recommend changes to casino personnel or automatically self change a bonusing plan provided by a specific gaming machine being played by a specific player based at least on one or more of the following: the actual hold for the specific gaming machine being played, the specific player, and/or the rate of play by the specific player.

In the examples above, the casino collected approximately 20 cents per minute more because the player sped up rate of play. The same may be true if the player increases the size of his/her wagers, if the gaming machine operates faster than normal, or if larger minimum wagers were configured. In one embodiment, at least a portion or the entire amount of the extra money collected by the casino may be returned to the player in the form of extra-bonus points or in the form of other types of bonus prizes to a player account or prize pool. This extra give-back bonus is called Extra-bonus and/or extra-award.

Types of Bonuses

Other types of prizes that the Extra-bonus may include, but are not limited to, any type of merchandise prize, service, promotional game credits, sweepstakes or raffle entries, or other currency exchangeable inside or outside the casino or at its affiliates.

In alternative embodiments, a player may be rewarded with Extra-bonus, which may be used for, among other things, entry into bonus games, advancement towards bonus games, better pay tables, or better game settings in special bonus rounds or games on a base game device or games on a player tracking display device such as iVIEW by Bally Technologies, Inc., or any other casino gaming device. Typically, the Extra-bonus may be provided to the player in the form of bonus points.

Casino System

Figure 5:
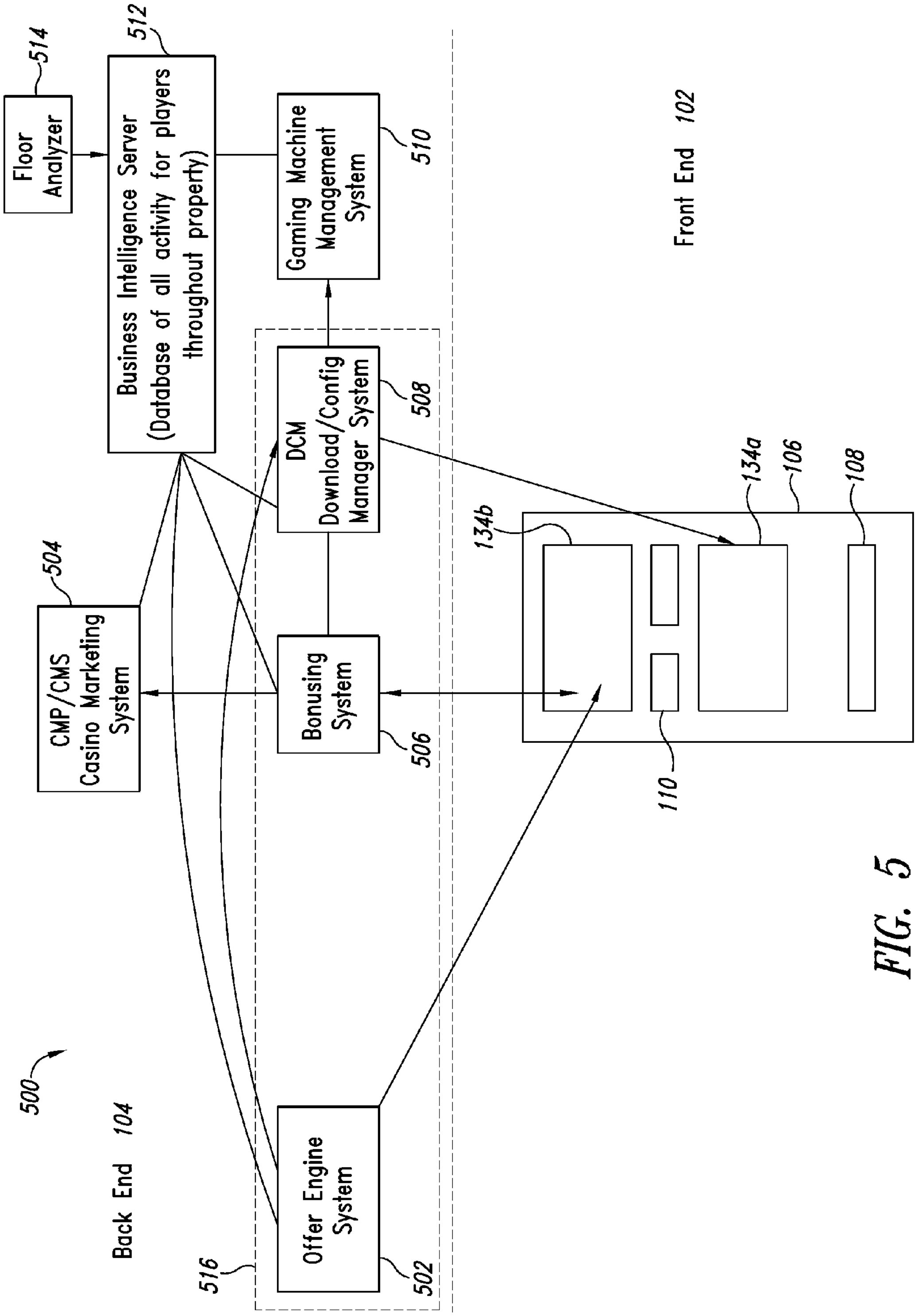
FIG. 5 is schematic diagram of a gaming-entertainment system environment such as a casino, according to one non-limiting embodiment.

FIG. 5 and the following discussion provide a brief, general description of a suitable casino 500 in which the various illustrated embodiments can be implemented. Although not required, the embodiments will be described in the general context of computer-executable instructions, such as program application modules, objects, or macros being executed by a computer. Those skilled in the relevant art will appreciate that the illustrated embodiments, as well as other embodiments, can be practiced with other computer system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network. In a distributed computing environment, program modules may be located in both local and remote memory storage devices.

FIG. 5 shows a casino system 500 comprising a front end 102 and a back end 104. The front end 102 includes one or more gaming machines 106. The back end 104 includes an offer engine system 502, a casino marketing system (CMP/CMS) 504, a bonusing system 506, a download/configuration manager system 508, a gaming machine management system 510, a business intelligence system 512, and a floor analyzer system 514. Various ones of the aforementioned systems may be individually or collectively embodied in one or more logical devices such as a custom made or commercially available processor, a central processing unit (CPU), a semiconductor based microprocessor (in the form of a microchip or chip set), or generally any device for executing software instructions, and/or may be individually or collectively embodied in firmware that is stored in a memory and that is executed by a suitable instruction execution system. If implemented in hardware, as in an alternative embodiment, the any one or all of the aforementioned modules and subsystems may be individually or collectively implemented with any or a combination of the following technologies: a discrete logic circuit(s) having logic gates for implementing logic functions on data signals, an application specific integrated circuit (ASIC) having appropriate combinational logic gates, a programmable gate array(s) (PGA), a field programmable gate array (FPGA), etc.

Among other things, the offer engine system 502 provides the gaming machine 106 with reconfiguration offers, which may be provided to the player of the gaming machine 106. Typically, a player may use the player interface 108 of the gaming machine 106 to accept or decline a reconfiguration offer. The reconfiguration offer may be indicative of reconfiguring bonusing at the gaming machine 106 such as changing from one bonus plan to another bonus plan or providing bonus points and additional awards such as additional bonus points. The reconfiguration offer may be indicative of reconfiguring a game title, e.g., game logic module/routine. For example, a game title may be reconfigured to use a different set of game title parameters. The different set of game title parameters may cause the game to play differently such as increasing/decreasing a play rate of the game. The reconfiguration offer may be indicative of reconfiguring the gaming machine 106 to play a different game title.

Among other things, the casino marketing system (CMP/CMS) 504 may gather data and statistics regarding bonus points awarded to players. The data and statistics may be used in promotions of the casino.

Among other things, the download/configuration manager system 508 may be capable of providing game code and an associated set of games to the gaming machine 106 and/or bonus plan(s) and/or bonus plan parameters. The download/configuration manager system 508 may provide game code and associated game title parameters and/or bonus plan logic and/or bonus plan parameters at scheduled times and/or upon request.

Among other things, the gaming machine management system 510 may provide an accounting of wins/losses at gaming machines 106 and/or of bonus points awarded.

Among other things, the business intelligence system 512 tracks every game play for identified and non-identified players, all bonusing promotions, and recommends to the download/configuration manager system 508 to do an automatic change to the casino floor to balance and to help maintain the overall business profitability. The business intelligence system 512 may collect data from all sources in the casino and aggregate this data to come up with an optimal floor configuration at any given time. These changes may happen automatically or may be shown to casino personnel for manual change.

Among other things, the floor analyzer system 514 may analyze the data collected by the business intelligence system 512. The floor analyzer system 514 may determine optimal or preferred configurations of gaming machines 106.

Among other things, the bonusing system 506 monitors the gaming machines 106 and determines average wagering rate of play on gaming machines 106. The bonusing system 506 may determine an average wagering rate of a specific player or a group of players. In addition, the bonusing system 506 may determine a wagering loss rate for a player on a gaming machine 106. In some embodiments, a player may accrue Extra-bonus based at least on a statistical calculation on data from the gaming machine 106. For example, if the player's average wagering rate exceeds a threshold, then the player may accrue Extra-bonus.

The bonusing system 506, or any other components of the casino system 500, may calculate various quantities, in real-time or in non-real time, and reconfigure a player's bonus plan accordingly. For example, if the bonusing system 506 calculates that a player's loss rate is higher than normal or the casino's gain rate is lower than normal, the bonusing system 506 may retune the bonus point earnings for a gaming machine being played by the player. The bonusing system 506 may provide Extra-bonus in addition to a normal bonus point accrual or in lieu of the normal accrual.

In some embodiments, at least one of player statistics, casino statistics, and/or bonus points accrued may be calculated, in whole or in part, by at least one of the following devices: the gaming device 106, peripherals (not shown) attached to the gaming device 106, Game Monitoring Units (GMUs), player tracking display devices such as iVIEWs, and computing systems and/or servers including, but not limited to, the bonusing system 506, casino marketing system (CMP/CMS) 504, download/configuration manager system 508, game play data storage servers, slot accounting servers (SDS/ACSC SMS/MCC) (not shown), gaming machine management system 510, business intelligence system 512, CRM servers, floor analyzer system 514, retail POS systems, entertainment show systems, etc.

In some embodiments, dynamic bonusing may be implemented in either or both of client-based execution of the gaming process and server-based execution of the gaming process. Messaging to the gaming machine 106, or game play device (not shown), a game combo (not shown) may also be to a server-based execution engine or a client-based execution unit.

For real-time calculated bonusing, various statistical quantities such as player loss rate, player wager rate, etc., may change several times during the session of game play of the player. A window of time may be used to calculate the sustained rate of play or extra loss rate that the player is experiencing while the game is in a special configuration mode of play. For example, every minute or so the bonusing system 506 may calculate the loss rate for a player. If the player has a higher loss rate when the game is in "re-configured" mode over the game in normal mode, the bonusing system 506 may provide the player with more bonus points than normal based at least on an amount of extra money the casino realized due to quicker play by the player and/or re-configuration of a game title (game logic module/routine) to play faster. In the examples above, the CasinoExcessGain of approximately 20 cents per minute earned by the casino may be in full or in part provided to the player in a variety of forms such as in accrued bonus points.

In some embodiments, the bonusing system 506 may provide a player with bonus points based at least on a predetermined percentage of the CasinoExcessGain or on a look-up table (see table 1).

CasinoExcessGain or PlayerExcessLoss can be calculated by comparing a specific player's new wagering rate versus what a previous player or group of players wagering rates were while the game was in non-reconfigured mode. Alternatively the calculation of CasinoExcessGain may be compared to how the specific player did previously when that game is in non-reconfigured mode. This wager rate comparison may use data from different days, different gaming devices, and different players to build a reference point to compare the player's wager rate during this session. For example, a casino may collect data from gaming machines 106 over a period of time, and then historical rate of play or wager rate can be determined for all players, groups of players, and individual players. In some embodiments, the casino may determine at least the aforementioned statistics for each individual gaming machine, for groups of gaming machines such as similar gaming machines, gaming machines executing similar game titles (game logic modules/routines), gaming machines executing similar game titles (game logic modules/routines) with similar associated sets of game title parameters, etc. In addition, historical data may be used as the data for calculation of CasinoExcessGain or PlayerExcessLoss of a specific player playing on a newly reconfigured or downloaded gaming machine. A player playing now on a certain game configuration may have his/her wagering rate compared to similar players playing at similar times of the day or days of the week or other similar time periods whether on the same machine or not.

The Extra-bonus may be given to the player at all times that their play rate goes beyond certain predetermined thresholds for the game machine, game play device, game title, or the specific player's historical rate of play for the game in normal configuration mode.

TABLE 1

EXTRA-BONUS LOOKUP TABLE

| ExcessLoss | ExcessBonus to Give |
|---|---|
| >30 cents | 0% |
| 11-30 cents | 50% |
| 6-10 cents | 75% |
| 0-5 cents | 100% |

In some embodiments, a player may be awarded bonus points that may be convertible to free credits on a gaming machine 106 and with the Extra-bonus the player may accrue more bonus points than without the Extra-bonus. Consequently, the player may have more opportunities to win on a base gaming machine than the player would otherwise have, such as if the gaming machine were configured for normal speed of play. Thus, the player may receive more total plays (spins) and may spend the same amount of time on the gaming machine as when the gaming machine is configured for normal play rate or as when the player plays at a normal play rate. Because Extra-bonus may provide the player with more opportunities to play a round of a game, the player has more jackpot opportunities for the game configuration being played. The player may find the increased number of jackpot opportunities incredible which may increase the player's appreciation of the overall experience at the casino.

On average, the casino makes the same amount of money with Extra-bonus, and the casino has a higher player satisfaction rate than casinos without Extra-bonus.

In one embodiment, the player's actual loss rate would be compared against the theoretical loss rate for the game combination (game play device) to calculate the Extra-bonus for the player. The same comparison can be done to calculate CasinoExcessGain rate versus theoretical gain rate for this game configuration. The resulting calculations would create the Extra-bonus for the player.

In alternate embodiments a scheduled configuration/download change can be large enough to automatically adjust the bonusing for all devices included in the configuration or download change. The actual configuration/download may not have to have been implemented on the gaming machines 106. The scheduled configuration/download change may then force reconfiguration of the bonus rate in the CMP/CMS 504 for a specific gaming machine, bank of gaming machines, player, group of players, or player types.

The bonusing system 506 may be notified in advance of the change, and the bonusing system 506 may start giving better or worse bonusing to accommodate this pending change. Players can be notified of these changes on overhead signage, on player tracking display devices such as (iVIEWs), on Game Screens, on their wireless devices, or other player notification means.

Disbursement of Extra-Bonus

The Extra-bonus may be provided directly into a player's account, i.e., the member record 126 associated with the player may be updated, or directly deposited onto the gaming machine such as into a player associated value meter or gaming machine associated value meter. In some embodiments, the Extra-bonus may fund a progressive prize pool available to a group of players, or a personal progressive prize pool. The progressives may trigger at a random time, a secret specific value, or a winning combination in a game, or by being a winner in a tournament. Other progressive triggering mechanisms would apply as well. In another embodiment the disbursement of the Extra-bonus would be sent to the gaming machine or a component device in the gaming machine for use as gaming credits or directly printed out of the printer in the form of a voucher. Also the awards could be put into a player smart card or similar personal computing device including electronic wallets in wireless devices owned by the player.

Notification to Player

In some situations, it may be important for the casino to notify the player that the player is earning more bonus points than normal. The player may be notified of their new bonus point earnings rate in various ways and on various devices. For example, this new improved bonus mode may be shown on the player tracking display device, with audio indications, with cabinet lighting, with the main game display monitor, with the players wireless device using email or text messaging notification, with mechanical bonus games attached to the gaming device or associated with the gaming device, on overhead LCD screens, at a casino gaming portal, at the players club desk, on the card reader device by special flashing of the lights or changing the colors of the lights, or on casino audio/speaker/pager systems. Notification to the player may include showing trigger levels required on player tracking display device such as (iVIEW) or game machine to achieve extra-bonusing.

In another embodiment, notification to a player playing a gaming machine may be conveyed to the player via graphical animations displayed on the gaming machine. For example, a balloon may be displayed on display device 134*a* or 134*b* and the balloon may inflate and deflate. If the balloon is inflated, the player may earn Extra-bonus, and if the balloon deflates, then normal bonusing would occur.

Unlike today where the normal bonusing and a countdown are displayed to a player (typically via the gaming machine being played by the player), a player's personal bonuses may accrue behind the scenes. When the player's personal bonuses are large enough to provide a bonus game, portion of a bonus game, bonus event, raffle ticket, sweepstakes tickets or any other prize award type, the player may be notified of the player's bonus points, bonus game, portion of a bonus game, bonus event, raffle ticket, sweepstakes tickets or any other prize award type. Typically, the player would be notified via any of the associated display devices 134*a*, 134*b*.

Redemption of Extra-Bonus

This Extra-bonus amount may be collected by a player at alternate locations or gaming devices. The Extra-bonus may be redeemed for cash, merchandise, or services both inside and outside the casino through various partner affiliations.

In some embodiments the Extra-bonus given to the player can be converted back into game credits, either automatically or at the request of the player. The player can use these credits to fund future game play. These credits may be restricted to be played on a gaming device and not cashed out. Conversely, the Extra-bonus may be awarded in a restricted player account which has specific withdrawal or redemption rules. This account may also have special expiration rules. The Extra-bonus may be required to be used at specific time periods, or only a certain portion can be used per unit time. For example, the casino may have redemption rules on prize award (only redeemable after 24 hours or next visit).

In some embodiments, the increased bonusing may be given to the player at businesses or servers outside the casino with third-party game sites including, but not limited to, sports book, keno, bingo, raffle sites, sweepstake sites, airlines frequent flier points, points.com, credit card point systems, grocery chain, hotel chain point systems, car rental agency point system, etc. These entities may be notified to give the player extra rewards or services for this player or user ID.

In alternate embodiments, the reconfiguration/download of a gaming machine is not required prior to changing the bonusing for the player. An actively playing player would have his/her wager rate monitored and compared to previous wager rates for this player, for this game combination (game play device), for previous identified or non-identified player(s) playing the same (game, game combination, or game play device), or for a group of players playing a similar configuration. Alternately, the comparison with a current player's wager rate could be against any number, even any preconfigured number. If predetermined thresholds are achieved, then this player's bonusing rate would be modified (or increased) as long as this rate is continued. Once play rate levels (wagers or losses per unit time) goes above or drops below certain pre-determined thresholds, the bonusing rate would be modified (raised or decreased) accordingly. Similar calculations as outlined previously could be used to calculate the Extra-bonus. These predetermined thresholds and numbers may be configured by casino personnel and stored in a central computer and are often sent to the game monitoring units for real-time calculation of wager rates and CasinoExcessWin. Alternatively, the real-time or non-real-time calculation of various statistical values may occur in a server not limited to the casino CMP/CMS system 504. Player notification would be similar as previously disclosed.

Player Qualification

In certain embodiments, dynamic bonusing may be available to certain player club membership levels only or special group of players. Alternatively, dynamic bonusing may only be available for certain specific players, specific gaming machines, group(s) of gaming machines, a group of players playing a group of games, or a specific player on a specific gaming machine, gaming device or game combo, game theme, or game play device. Certain players may have to play on specific machines or game titles to get the benefit of this dynamic bonusing. In some embodiments, only the first player after a configuration/download change of a gaming machine may be offered the opportunity to accrue new bonusing tied to excess wagering.

In another embodiment, a player may have to wager a minimum amount per play or at a minimum rate per unit time to earn any bonusing, bonus points, Live Rewards Play Points, extra-bonusing, etc.

Unidentified Players

In some embodiments, Extra-bonus may even be calculated for non-identified or non-carded players, e.g., players who have not enrolled in a membership club. Since there is no player card (member identification medium 112) associated with the player, the Extra-bonus may be given on the base game with a modified game or bonus round, extra game play credits, an enriched game pay table, an improved game setting or option, or a cash or bonus voucher may be printed from the gaming device which includes this Extra-bonus or portion thereof. The Extra-bonus may be restricted and have to be played off as game promotional credits by the player on this gaming machine, at another gaming device, or at a gaming web portal.

In some embodiments, unidentified players may have CasinoExcessGain bonusing calculated on their play while a respective game is in a modified configuration. The ExcessBonusing of the unidentified players may be given to carded players in proportion to their wagering during a time period. Carded players would be notified of this bonusing given to them to let them know other people are giving them a bonus. Unidentified players may be also notified that they are giving bonus money to identified players to motivate them to become identified players (normally carded players).

Alternatively, unidentified players may receive their bonus as they play their primary game. The bonus would not be put in an account because the account does not exist. A temporary account may be created for a player to later redeem his/her bonus. A user may receive a printed ticket with the temporary number or bonus prize for redemption at a later time or conversion into an actual account. The player may be asked to remember a special code to reference the temporary account and no ticket would be needed. Or any magnetic card in the player's wallet could be used to associate a temporary account with this card. The Extra-bonus calculated from unidentified players may optionally fund prize pools available to identified players only. Various award techniques for this pool could be used.

Table Games

In alternate embodiments, table games can have electronic games or bonus games downloaded to the table or shown at the table through the use of displays. When the new game or configuration is in effect, the CasinoExcessGain or PlayerExcessLoss can also be calculated and the player's bonusing can be affected as well. A player may accrue comp points, bonus points, play points, cash, bonus cards, insurance cards, wild cards, bonus game or any other form of casino currency or bonus differently because of the new CasinoExcessGain or PlayerExcessLoss. The electronic download and reconfiguration of new gaming software will then trigger new calculations of the bonus earnings rate for this player. This will be done to ensure the player is satisfied with the overall entertainment experience.

Alternatively, a dealer may be asked to speed up his/her deal/rate or play rate at certain busy times, thus bonusing may be modified to accommodate for this new rate of play/wagering. For example, the Bally TMS intelligent tables would note the new play rate and increase bonusing accordingly. Or the dealer or the pit boss or other casino personnel could enter the new bonusing rate or wagering rates for specific or groups of players on the floor tables. This could be done with wireless or wired devices to the bonusing systems.

Modify Live Rewards Bonus Games

In alternate embodiments, a player's Live Rewards Play Points may accrue differently based on this excess wagering by a player. These Play Points are earned as a percentage of the players wagering on the primary base game play device. These points are normally set to a fixed level and accrue after a player identifies him/herself and begins wagering on the base game device. The Play Points can be spent on bonus games on the player tracking display device display, such as iVIEW display or on the top or bottom monitor on Bally Technologies' Alpha slot machine either inside or outside of its associated web browser. When a player is offered a bonus game or a bonus tournament game on the iVIEW or Alpha Monitor, an increased rate of play of the base game is normally observed. This leads to a greater loss rate for the player or greater gain rate for the casino. A player will, on average, go through their funds at a quicker rate than normal and, as such, are entitled to a higher bonus rate. This higher bonus can be given in the form of all casino currencies, points, or any other entitlement the casino can offer, including all services. When the CasinoExcessGain or PlayerExcessLoss is calculated, the player's Live Rewards Play Points may be increased or decreased in real-time. Visual indication of this new accrual rate is given to the player to notify that this is in effect.

DCM & Bonus Systems

In one embodiment, gaming machine configurations may be associated with bonus plans. For example, different game titles at a gaming machine may be associated with different bonus plans. Similarly, the same game title, but with different game title parameters, may be associated with different bonus plans. For example, in the download/configuration manager system 508, a specific configuration/game download Change ID, (JOB ID#), CONFIGURATION ID#, GAME PLAY DEVICE, Game COMBO, etc. may have an associated bonus Calculation ID. Each bonus Calculation ID has an associated formula or lookup table associated with it stored in any server or system such as the download/configuration manager system 508. When a reconfiguration or game change is implemented on a gaming device, the associated bonus calculation formula is implemented in the bonusing systems. A message from the reconfigured game device and/or the download/configuration manager system 508 may inform the bonusing system 506 that the game device is being (or was) reconfigured using a specific Change ID, (JOB ID#), or CONFIGURATION ID#, or GAME PLAY DEVICE, Game COMBO. The bonusing system 506 may look up the appropriate bonus Calculation ID and then modify its bonus accrual based on the formula or lookup table. The bonusing system 506 may use the historical rate of play/wagering for a Configuration or Game for use in its calculation of the new bonus for a specific player or the Game Device as a whole.

There are multiple ways in which dynamic bonusing may be provided to players of a casino. For example, the offer engine system 502 may provide the gaming machine 106 with a bonusing offer indicator. The gaming machine 106 may notify the player of the gaming machine 106 of a bonusing offer based at least on the bonusing offer indicator by, for example, displaying an indication of the bonusing offer on one or both of the display devices 134*a*, 134*b*. The player may decide to accept or decline the bonusing offer. In some embodiments, if the player does not accept the bonusing offer within a given period of time, the player has effectively declined the bonusing offer and the gaming machine 106 will no longer display the indication of the bonusing offer to the player. In some embodiments, the bonusing offer may remain valid until the player accepts the bonusing offer. The player may accept or, if necessary, decline the bonusing offer using the player interface 108.

The gaming machine 106 may provide the offer engine system 502 with a player response indicator. The player response indicator may be indicative of the player's acceptance or rejection of the offer.

In some embodiments, the offer engine system 502 may wait for a given period of time or an indefinite period of time for the player response indicator from the gaming machine 106. Until the offer engine system 502 receives the player response indicator, and the player response indicator is indicative of the player's acceptance of the bonusing offer, the offer engine system 502 may treat the bonusing offer as being effectively rejected.

If the player accepted the bonusing offer, the offer engine system 502 provides download/configuration manager system 508, and may also provide the business intelligence system 512, with a gaming machine change indicator, which may, among other things, include an indicator of the specific gaming machine 106. Among other things, the download/configuration manager system 508 may cause a change in the gaming machine 106 based at least on the gaming machine change indicator by providing the gaming machine 106 with one or more of the following: logic module/routines such as, but not limited to, game logic modules/routines and/or bonus plan logic modules/routines; data/parameters such as, but not limited to, one or more sets of game title parameters and/or one or more sets of bonus plan parameters; and instructions. In some embodiments, the gaming machines 106 may be loaded with one or more game logic modules/routines and/or bonus plan modules/routines and, if necessary, associated sets of game title parameters and/or bonus plan parameters, and the gaming machines 106 may be reconfigured based at least on instructions from the download/configuration manager system 508.

In addition, the download/configuration manager system 508 may provide one or more of the bonusing systems 506, gaming machine management system 510, and business intelligence system 512 with a gaming machine configuration indicator that may be indicative of the current state/configuration of the gaming machine 106 and/or indicative of a change to the current state/configuration of the gaming machine 106.

The bonusing system 506 may monitor, among other things, player wagering and play rate of the gaming machine 106. The bonusing system 506 may provide one or more of the casino marketing system (CMP/CMS) 504 and the business intelligence system 512 with a player bonus indicator that may be indicative of, among other things, bonus points awarded to the player, Extra-bonus awarded to the player, player rate of play, player wagering, etc.

Among other things, the bonusing system 506 may monitor the gaming machine 106 to determine whether to change the state/configuration of the gaming machine 106. Based at least on information gathered by monitoring the gaming machine 106, the bonusing system 506 may determine that the player should be offered yet another bonus plan, which may have an accrual rate better than the player's current bonus plan and/or lower than the player's current bonus plan. The bonusing system 506 may provide the offer engine system 502 and/or the business intelligence system 512 with a change bonus plan indicator that may be indicative of a bonus plan that is different from the player's current bonus plan.

Based at least on the change bonus plan indicator, the offer engine system 502 may provide the gaming machine 106 with yet another bonusing offer indicator. In some embodiments, if the change bonus plan indicator is indicative of a bonus plan that is not as favorable to the player as the player's current bonus plan, the offer engine system 502 may provide the gaming machine 106 with a bonus plan decrement indicator. Based on the bonus plan decrement indicator, the gaming machine 106 may provide the player with an indication that the player's current bonus plan may be changed to another bonus plan and/or with an indicator of actions that the player should take to retain the player's current bonus plan such as increasing the player's rate of play and/or increasing the wager amount of the player.

In one embodiment, the bonusing system 506 may configure new types of player bonusing. The download/configuration system (DCM) 508 may be notified to implement a change to the gaming machines 106.

Among other things, the business intelligence system 512 may track every game play for identified and non-identified players. In addition, the business intelligence system 512 may track all bonusing promotions. The business intelligence system 512 may recommend to the download/configuration system (DCM) 508 to do an automatic change to the casino floor to balance and to help maintain the overall business profitability. The business intelligence system 512 may collect data from some or all sources in the casino and aggregate this data to come up with an optimal floor configuration at any given time. These changes may happen automatically or may be shown to casino personnel for manual change. A typical example would be when the casino runs a new progressive or tournament that gives $100,000 away. The business intelligence system 512 can recommend that a group of gaming machines be reconfigured to a higher minimum bet or denomination, or the reel speed may be made faster, or any other type or reconfiguration. This would help generate new revenue on these machines and counter the $100,000 promotion. The reconfiguration may only happen for specific club level players or for specific individual players or groups of players.

Casinos have to be very careful in implementing new promotional giveaways because they always risk going into the red financially while these promotions run. It is often difficult to calculate the total of all promotions and how they affect the overall casino's financials. The business intelligence system 512 may aggregate all of the promotions and give a complete view to the casino personnel of what the expected profitability is because it can take into account the entire gaming floors' current or proposed configurations as well as all other casino or casino related activity. The business intelligence system 512 may calculate a theoretical or expected rate of return or profitability/loss statement for running gaming machine configurations and for proposed bonusing based at least on historical data. The casino can retune or reconfigure either the bonus promotions or the download/configurations for the gaming floor based on the expected rate of return or profitability/loss statement.

If casino personnel configure a combination of promotions that award something of value to players, the business intelligence system 512 may recommend a floor configuration for the gaming devices. Typically, gaming machine configurations and bonusing configurations are directly related to the profitability of the casino. If the bonusing system 506 is configured to provide players with a large number of bonus points, then the gaming machines should be configured to create a large casino hold rate. The corollaries hold true as well.

Predetermined thresholds or formulas can be preconfigured such that if you change either the casino hold rate or the bonus system, then comparisons can be made against these preconfigured thresholds or formulas so as to force a corresponding automatic change to the other. As with all automatic changes to any system there will be errors. To compensate for these errors, real historical data may be used to retune the bonusing system 506, the business intelligence system 512, and/or the download/configuration manager system 508.

In one embodiment, prior to or concurrent with the start of a promotion, the download/configuration manager system 508 may be notified before the start of the promotion to implement changes to the floor of the casino such as reconfiguring the gaming machines 106. As the success of the promotion is determined, the actual business profitability may be calculated and the bonusing system 506, the download/configuration manager system 508, and/or the gaming machine management system 510 may be automatically retuned. The retuning may occur in real-time and may occur several to many times throughout the duration of the promotion. It could also occur with or without human intervention by the casino personnel. The promotion may generate new revenue, and if the new revenue exceeds predetermined thresholds, then a specific bonus or group of bonus plans may be retuned and/or automatically disabled and/or accelerated.

The bonusing system 506 and/or the gaming machine management system 510 may gather data and analyze the data to calculate, among other things, bonusing rates for players. Table 2 shows exemplary types of data that may be collected.

TABLE 2

LOGGING TABLE (FOR SPECIFIC CONFIGURATIONS/GAMES TO PLAY RATE)

| GameID (GamePlayDevice/Combo) | Player ID | wager | game length | game outcome | timeforlast wager | Bonus ID |
|---|---|---|---|---|---|---|
| Config ID # 1001 (normal mode) | | | | | | |
| BAL_Blazing 7 s 90% | 1875 | $1.00 | 3 sec | $0 | 6 sec | 187 |
| BAL_Blazing 7 s 90% | 1875 | $1.00 | 3 sec | $.25 | 5.8 sec | 194 |
| BAL_Blazing 7 s 90% | 1875 | $1.00 | 3 sec | $0 | 4.2 sec | 187 |
| New Config ID #1007 (quick reels) | | | | | | |
| BAL_Blazing 7 s 90% | 1875 | $0.50 | 2 sec | $1 | 3.5 sec | 153 |
| BAL_Blazing 7 s 90% | 1875 | $0.50 | 2 sec. | $0 | 3.9 sec | 472 |
| BAL_Blazing 7 s 90% | 1875 | $2.00 | 2 sec | $0 | 3.6 sec | 4 |

In one embodiment, a new bonus rate may be calculated if a calculated theoretical loss rate for sustained play of gaming machines in a new faster game mode is greater than the average loss rate for gaming machines in normal mode for sustained play plus a predetermined amount.

In one embodiment, a new bonus rate may be calculated if a theoretical CasinoGain rate for sustained play with gaming machines in a new faster game mode is greater than the average CasinoGain rate for sustained play of gaming machines in normal mode plus a predetermined amount.

In one embodiment, the offer engine system 502, bonusing system 506, download/configuration manager system 508, gaming machine management system 510, and business intelligence system 512 may comprise a bonusing feedback system 516. In some embodiments, the bonusing feedback system 516 monitors the gaming machine 106 and dynamically reconfigures the gaming machine 106 based at least on data gathered from monitoring the gaming machine. In some embodiments, the dynaminc reconfiguration of the gaming machine by the bonusing feedback system may be based at least on data gathered from monitoring the gaming machine and acceptance of a reconfiguration of the gaming system 106.

Play Rate Parameters and Slaver Inducements

To increase/decrease the rate of game play of various game titles on various gaming machines the download/configuration manager system 508 may vary any of the following, which is not an exhaustive list, on various gaming machines:

a) length of bonus rounds;

b) rate of card dealing in card games;

c) number of tips provided to a player;

d) length of animation sequence at beginning/end of game;

e) show several or all winnings lines at once instead of one at a time;

f) game auto-play rate;

g) duration of audio effects;

h) mechanical reel quick stop sequence (S9000) (rhythmic Reels);

i) game skin (theme modifications), e.g., provide less data for a player to look at;

j) number of control panel options provide to player, e.g., programmable button deck of player interface;

k) frequency of group play game or bonus round initiation (will lead to larger prize pools with less frequent entry by players);

l) duration of decision time given to players (player must decide within a given period of time or the game will make moves for the player);

m) tournament mode (player may increase his/her play rate in an attempt to increase his/her score to overtake other players);

n) offering free credits if a player wagers faster;

o) pay table changes (do not pay for frequent winning combinations)

p) tease the player to doing certain gaming behaviors q) reel speed or reel stop sequence speed.

Bonus Offer to a Player

A player may be offered a game configuration or game title and also be offered a corresponding bonus offer. If the player accepts the bonus offer, then the appropriate download/configuration is implemented and new bonusing is activated for this player. The new bonusing may be provided as an inducement for accepting the configuration/download change to a gaming device. Some jurisdictions may require that no change may take place when there are credits on a gaming machine and until there is a certain period of inactivity on the gaming machine. Once these rules are met, a gaming machine must tilt itself for a period of time as the reconfiguration takes place. After the reconfiguration there is also a required inactive play period of time.

However, in some jurisdictions, if a player accepts a reconfiguration of a gaming machine, such as by pressing a button or touching a touch sensitive screen, or by speaking or providing other input to the gaming machine or one of its associated peripherals or input devices, then the jurisdictional rules become nullified for the transaction. By allowing the player to accept the reconfiguration/download offer, the player is in effect overriding the restriction and allowing the change to happen. Thus, the gaming machine operating system and/or the game logic module/routine may be configured to bypass the normal jurisdictional rules for this one transaction approved by the player. A player may be rewarded for bypassing the normal jurisdictional rules through new bonusing associated with the new configuration or download. Having the player accept the reconfiguration may satisfy regulatory concerns, and allows the player to immediately get the new product.

Figure 6:
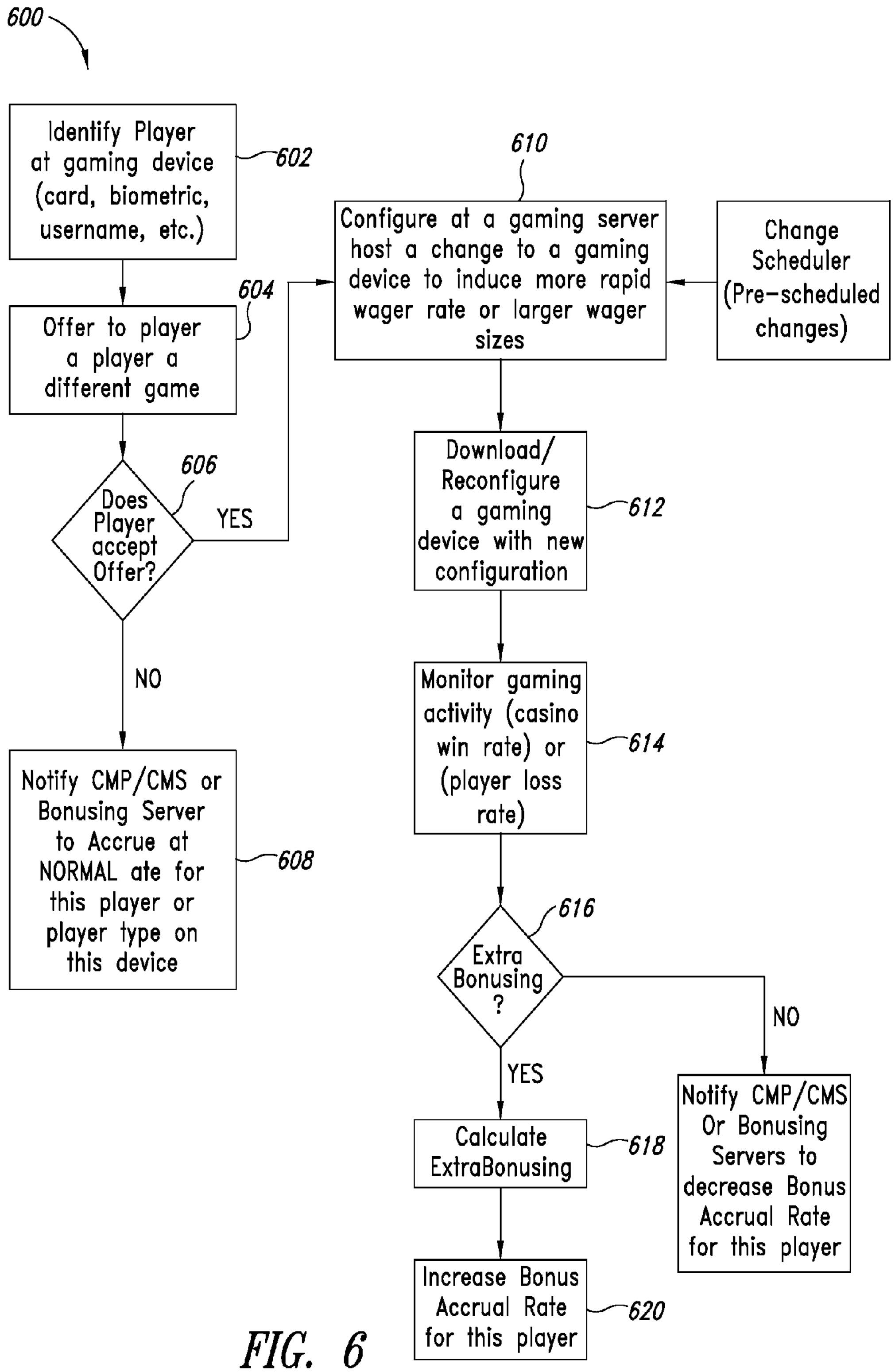
FIG. 6 is a flow diagram of a method for providing dynamic bonusing to a player, according to one non-limiting illustrated embodiment.

FIG. 6 shows a method 600 for providing dynamic bonusing to a player according to one non-limiting illustrated embodiment.

At 602, a player is identified at a gaming machine 106. The player may be identified based on an indicator of member identification information read from a member identification medium 112 by the reader 110 of the gaming machine 106. Alternatively, the player may be identified based on biometric data, a username provided by the player, etc.

At 604, the player may be offered the opportunity to play a different game.

At 606, the player may accept or decline the offer of a different game. If the player declines/rejects the offer of a different game, then, at 608, the player's bonus plan remains unchanged.

If the player accepts the offer of a different game, then, at 610, a configuration for the player's gaming machine is determined. The determined configuration may be such that the player may be induced to wager more rapidly and/or to wager larger amounts.

At 612, the player's gaming machine is reconfigured. The reconfiguration of the player's gaming machine may be based on data, instructions, and/or logic modules/routines from the download/configuration manager system 508.

At 614, gaming activity at the player's gaming machine is monitored. Various statistical quantities such as casino gain rate, player loss rate, wager rate, or player rate may be calculated based on information gathered by monitoring the gaming activity at the player's gaming machine.

At 616, a determination is made as to whether to award the player Extra-bonusing. The determination may be based at least on a calculated statistical quantity such as whether the casino gain rate exceeds a threshold value. If the determination is affirmative, the method continues at 618.

At 618, Extra-bonusing for the player is calculated.

At 620, the player's bonus point accrual rate is increased. Various components such as the casino marketing system (CMP/CMS) 504 and/or the bonusing system 506 may be notified to increase the player's bonus point accrual rate.

If the determination at 616 is negative, the method continues at 622. At 622, the player's bonus point accrual rate is decreased. Various components such as the casino marketing system (CMP/CMS) 504 and/or the bonusing system 506 may be notified to decrease the player's bonus point accrual rate.

In some embodiments and some situations, the player's gaming machine may be pre-scheduled for a reconfiguration. In that case, if the player accepted the offer to play a different game at 608, then, at 624, the prescheduled reconfiguration of the player's gaming machine is changed.

Figure 7:
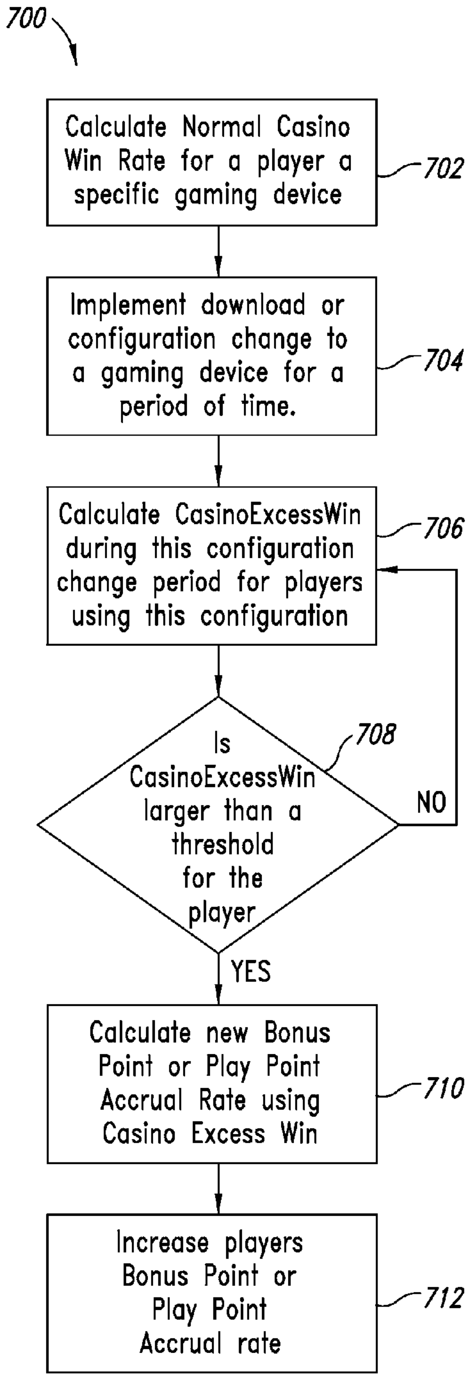
FIG. 7 is a flow diagram of a method for providing dynamic bonusing to a player, according to one non-limiting illustrated embodiment.

FIG. 7 shows a method 700 for providing dynamic bonusing to a player according to one non-limiting illustrated embodiment.

At 702, a normal CasinoGain Rate for a player playing a specific gaming device is calculated.

At 704, for a period of time, one or more gaming machines are reconfigured. A download or configuration change to the gaming machines may be implemented.

At 708, during the period of time that the one or more gamining machines are reconfigured, CasinoExcessGain for players using the reconfigured gaming machines is calculated.

At 708, determine if CasinoExcessGain is larger than a threshold for the respective players. If yes then proceed to 710. If no then return to 706.

At 710, calculate new bonus point, or Play Point, accrual rate based at least on Casino Excess Win.

At 712, increase players bonus point, or Play Point, accrual rate.

Figure 8:
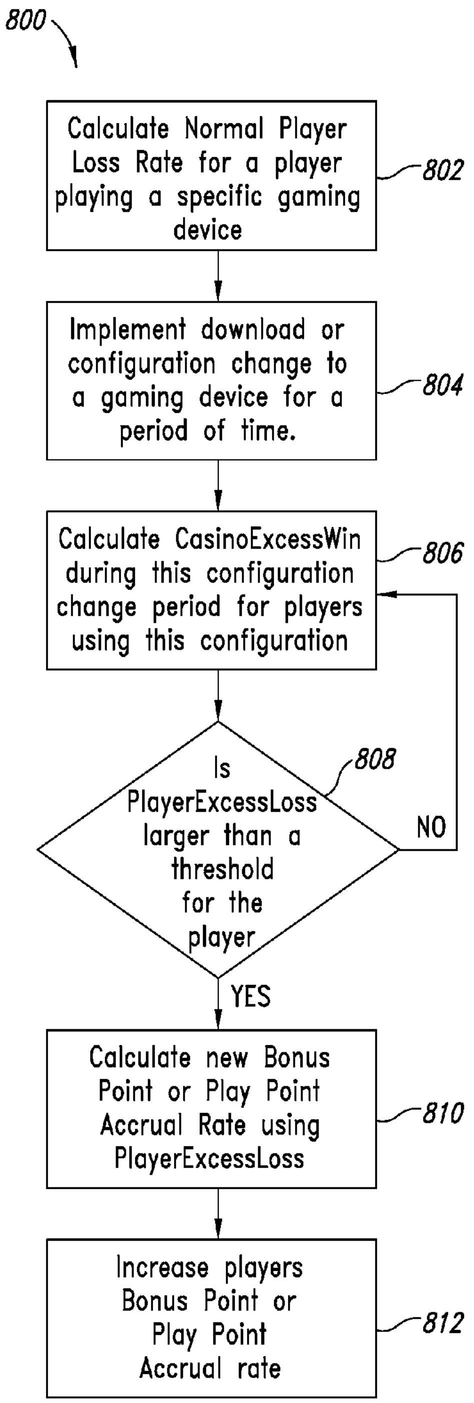
FIG. 8 is a flow diagram of a method for providing dynamic bonusing to a player, according to another non-limiting illustrated embodiment.
Figure 9:
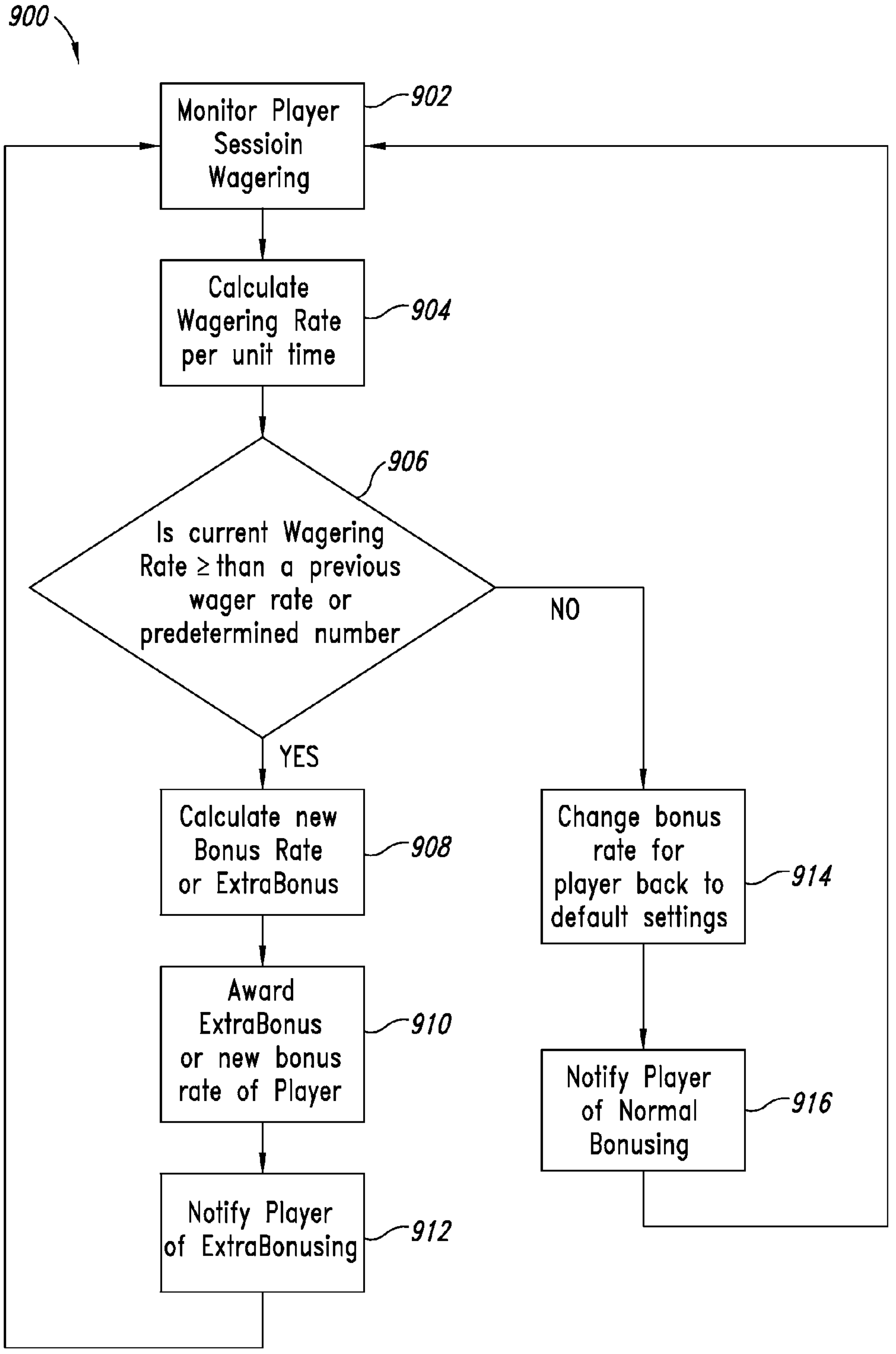
FIG. 9 is a flow diagram of a method for providing dynamic bonusing to a player, according to another non-limiting illustrated embodiment.

FIG. 8 shows a method 800 for providing dynamic bonusing to a player according to one non-limiting illustrated embodiment.

At 802, calculate normal player loss rate for a player(s) playing a specific configuration of a gaming machine(s).

At 804, implement download or configuration change to the gaming machine(s) for a period of time.

At 806, calculate PlayerExcessLoss during this configuration change period for players using this configuration.

At 808, determine if PlayerExcessLoss is larger than a threshold for the respective player. If yes, then proceed to 810. If no, return to 806.

At 810, calculate new bonus point, or Play Point, accrual rate based at least on PlayerExcessLoss.

At 812, increase players bonus point, or Play Point, accrual rate.

FIG. 8 shows a method 800 for providing dynamic bonusing to a player according to one non-limiting illustrated embodiment.

At 902, monitor Player Session Wagering.

At 904, calculate Wagering Rate per unit time.

At 906, determine if current Wagering Rate is greater than or equal than a previous wager rate or predetermined number. If Yes continue to 908. If no continue to 914.

At 908, calculate new bonus rate or Extra-bonus.

At 910, award Extra-bonus or new bonus rate to player. Then proceed to 912.

At 912, notify player of Extra-bonusing. Then return to 902.

At 914, change bonus rate for player back to default settings.

At 916, notify player of normal bonusing. Then proceed back to 902.

Figure 10:
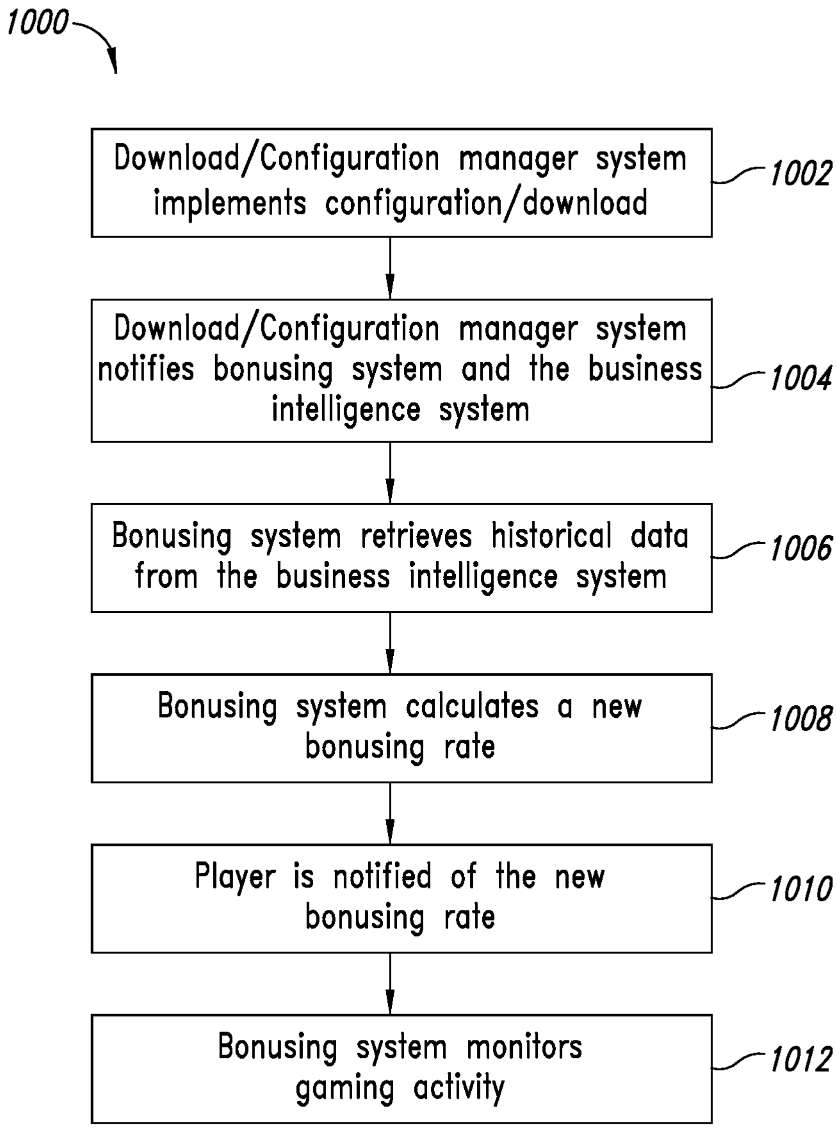
FIG. 10 is a flow diagram of a method for providing dynamic bonusing to a player, according to yet another non-limiting illustrated embodiment.

FIG. 10 shows a method 1000 for providing dynamic bonusing to a player according to one non-limiting illustrated embodiment.

At 1002, the download/configuration manager system 508 implements the configuration/download for a gaming machine being played by a player.

At 1004, the download/configuration manager system 508 notifies various systems of the casino, such as the bonusing system 506 and the business intelligence system 512, that the configuration/download for the gaming machine occurred.

At 1006, the bonusing system 506 retrieves historical data from the business intelligence system 512. The historical data may include configuration based play data, e.g., play data for the gaming machine (or other gaming machines or a group of gaming machines) in the old configuration and in the new configuration.

At 1008, the bonusing system 506 calculates a new bonusing rate for the player based at least on the new configuration of the player's gaming machine and the historical data.

At 1010, the player is notified of the new bonusing rate.

At 1012, the bonusing system 506 monitors gaming activity such as the wager rate of the player with the gaming machine in the new configuration.

Figure 11:
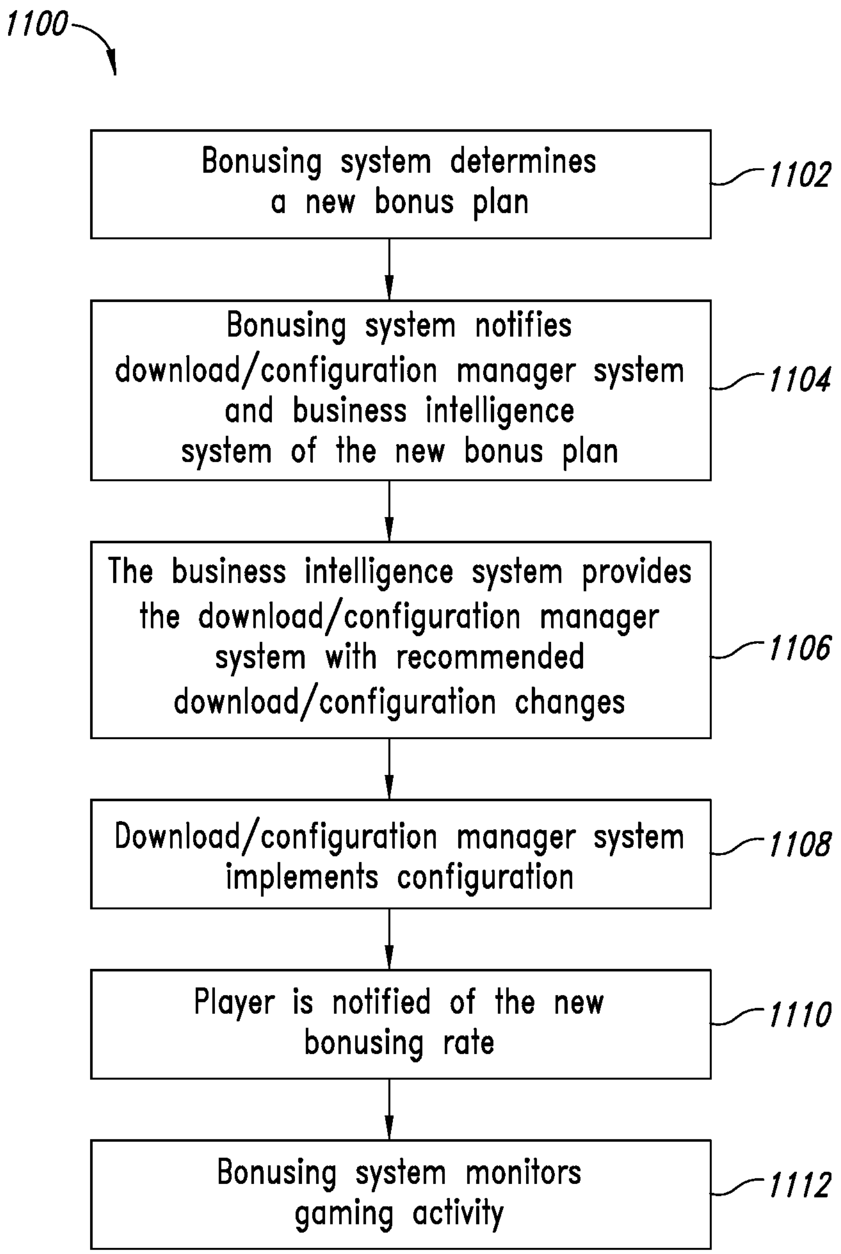
FIG. 11 is a flow diagram of a method for providing dynamic bonusing to a player, according to a further non-limiting illustrated embodiment.

FIG. 11 shows a method 1100 for providing dynamic bonusing to a player according to one non-limiting illustrated embodiment.

At 1102, the bonusing system 506 determines a new bonus plan for a gaming machine being played by a player. The new bonus plan may be part of a promotion or pre-scheduled.

At 1104, the bonusing system 506 notifies various systems of the casino, such as the download/configuration manager system 508 and the business intelligence system 512, of the new bonus plan.

At 1106, the business intelligence system 512 provides the download/configuration manager system 508 with recommended download/configuration changes based at least on historical data.

At 1108, the download/configuration manager system 508 implements the configuration/download for the gaming machine being played by the player.

At 1110, the player is notified of the new bonusing rate.

At 1112, the bonusing system 506 monitors gaming activity such as wager rate of the player with the gaming machine in the new configuration.

Figure 12:
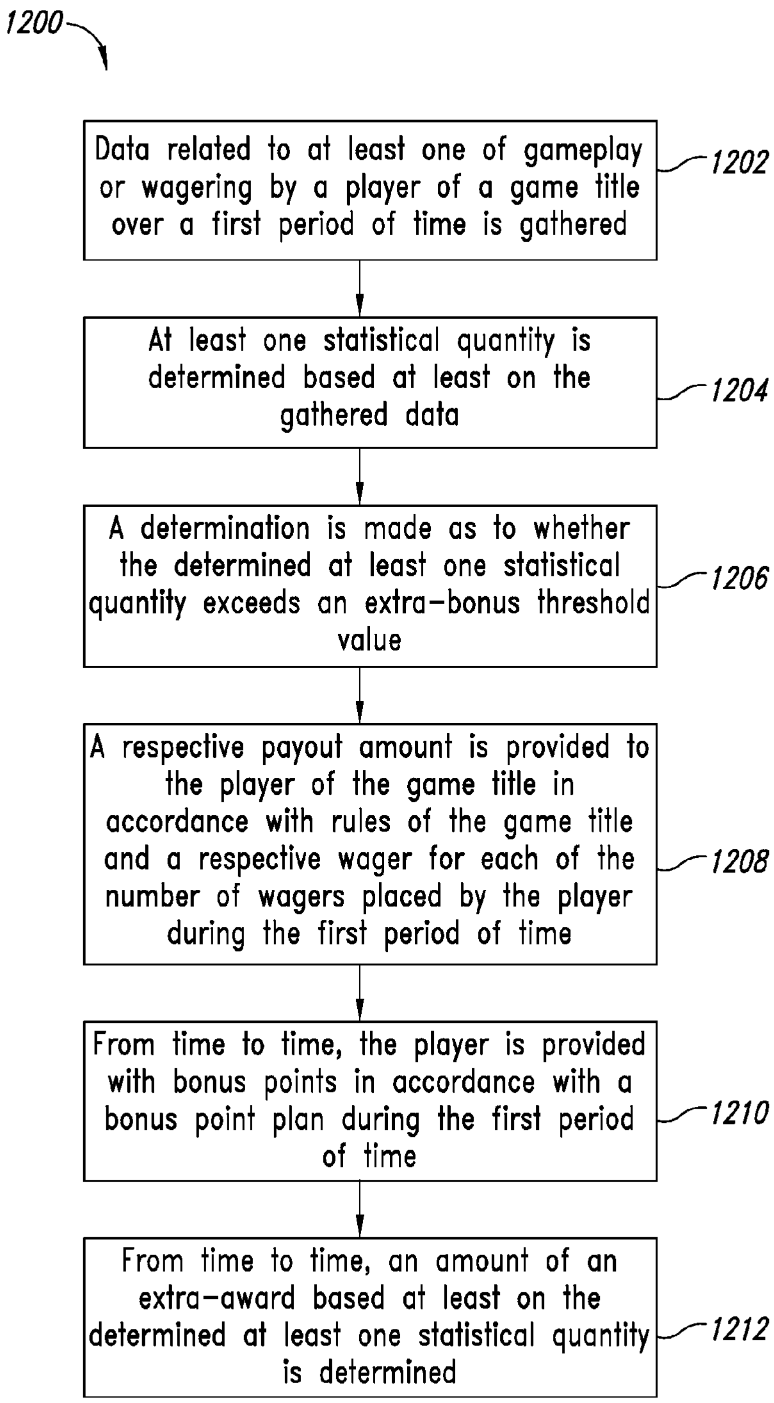
FIG. 12 is a flow diagram of a method for providing dynamic bonusing to a player, according to a further non-limiting illustrated embodiment.

FIG. 12 shows a method 1200 for enhancing gaming according to one non-limiting illustrated embodiment.

At 1202, data related to at least one of gameplay or wagering by a player of a game title over a first period of time is gathered. Typically, the player places a number of wagers during the first period of time.

At 1204, at least one statistical quantity is determined based at least on the gathered data.

At 1206, a determination is made as to whether the determined at least one statistical quantity exceeds an extra-bonus threshold value.

At 1208, a respective payout amount is provided to the player of the game title in accordance with rules of the game title and a respective wager for each of the number of wagers placed by the player during the first period of time.

At 1210, from time to time, the player is provided with bonus points in accordance with a bonus point plan during the first period of time.

At 1212, from time to time, an amount of an extra-award based at least on the determined at least one statistical quantity is determined.

In some embodiments, to determine at least one statistical quantity from the gathered data may include to determine a loss rate for the player, the loss rate given by (TPA−TWA)/N, where the TWA, total wager amount, is an aggregate amount of the number of wagers placed the player, where TPA, total payout amount, is an aggregate amount of the respective payout amounts for the number of wagers placed by the player, and N is one of a number of games of the game title played or a length of time.

In some embodiments, for each of the number of wagers placed by the player during the first period of time, the respective wager is collected in accordance with rules of the game title. In that case to determine at least one statistical quantity from the gathered data may include to determine a gain rate for an entity collecting the respective wagers, the gain rate given by (TCA−TPA)/N, where the TCA, total collected amount, is an aggregate amount of the collected wagers placed the player, where TPA, total payout amount, is an aggregate amount of the respective payout amounts for the number of wagers placed by the player, and N is one of a number of games of the game title played or a length of time.

In some embodiments, to determine at least one statistical quantity from the gathered data may include to determine a play rate for the player, the play rate given by a number of games of the game title played by the player divided by the first period of time.

In some embodiments, to determine at least one statistical quantity from the gathered data may include to determine a wager rate for the player, the wager rate given by an aggregate of the number of wagers divided by the number wagers.

In some embodiments, the method 1200 may optionally provide the player with an offer to reconfigure a gaming machine being played by the player.

In some embodiments, the method 1200 may optionally reconfigure the gaming machine from a configuration of the gaming machine during the first period of time to a different configuration in response to the player accepting the offer to reconfigure the gaming machine.

In some embodiments, the method 1200 may optionally reconfigure the gaming machine to provide a round of the game title at a new rate of play, wherein the new rate of play is different from a rate of play for a round of the game title during the first period of time.

In some embodiments, the method 1200 may optionally reconfigure the gaming machine to provide a respective amount of extra-award based at least on a new bonus plan, wherein the new bonus plan is different from a bonus plan provided offered to the player during the first period of time. In that case, in some embodiments the method 1200 may optionally reconfigure the gaming machine to provide a respective amount of extra-award based at least on a new bonus plan includes changing a rate of extra-bonus point accrual based at least on an aggregate amount of the wagers placed during the first period of time. Alternatively, in some embodiments the method 1200 may optionally reconfigure the gaming machine to provide a respective amount of extra-award based at least on a new bonus plan includes changing a rate of extra-bonus point accrual based at least on an aggregate amount of the payouts during the first period of time.

In some embodiments, the method 1200 may optionally determine a total number of extra-award based at least on a first bonus point accrual rate during the first time period; determine a second extra-award accrual rate based at least on the data gathered during the first period of time; and during a second period of time, from time to time, determine an amount of an extra-award based at least on the determined second extra-award accrual rate.

In some embodiments, the method 1200 may optionally identify the player based at least on information indicative of a member identification; associate at least a portion of an aggregate of the bonus points provided to the player during the first period of time with a member account based at least on the member identification; and associate at least a portion of an aggregate of the amount of extra-award determined during the first period of time with a member account based at least on the member identification.

In some embodiments, the method 1200 may optionally identify a number of other players based at least on information indicative of a respective member identification for each of the number of other players, each of the other players associated with a respective member account; and associate at least a portion of an aggregate of the amount of extra-award determined during the first period of time with the respective member account associated with a respective one of the other players.

In some embodiments, the method 1200 may optionally notify at least one respective player of the other players that the respective player is receiving at least a portion of the determined amount of the extra-award. In that case, in some embodiments, the method 1200 may optionally notify the player that at least one respective player of the other players that the respective player is receiving at least a portion of the determined amount of the extra-award. Alternatively, in some embodiments, the method 1200 may optionally notify the player of an account having a least a portion of the determined amount of the extra-award associated therewith, wherein no association between the account and the player exists; and may provide the player with account access. In some embodiments, to provide the player with account access may include to provide the player with a tangible medium carrying information indicative an account identifier for the account. In some embodiments, to provide the player with account access may include to provide the player with information indicative an account identifier for the account.

In some embodiments, the method 1200 may optionally notify the player that the player may receive at least a portion of the determined amount of the extra-award subject to the player joining a membership club. In some embodiments, the method 1200 may optionally enroll the player in the membership club; and may associate at least a portion of the determined amount of extra-award with a member account established for the player.

Figure 13:
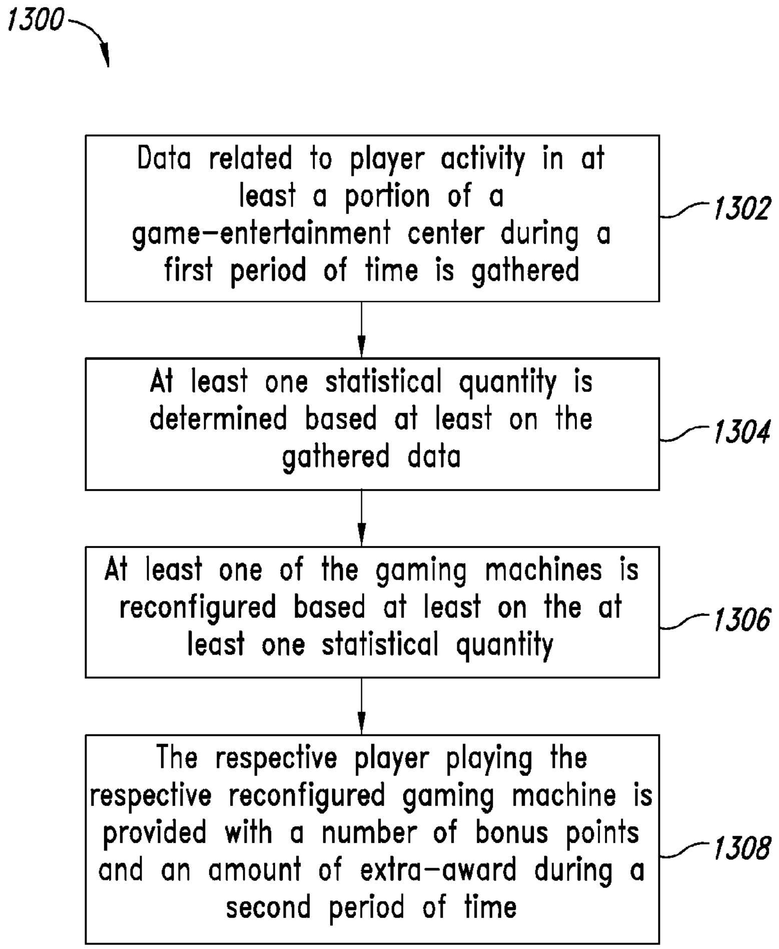
FIG. 13 is a flow diagram of a method for providing dynamic bonusing to a player, according to a further non-limiting illustrated embodiment.

FIG. 13 shows a method 1300 for enhancing gaming according to one non-limiting illustrated embodiment.

At 1302, data related to player activity in at least a portion of a game-entertainment center during a first period of time is gathered. The game-entertainment center has a number of gaming machines that are being played by a number of players during the first time period.

At 1304, at least one statistical quantity is determined based at least on the gathered data.

At 1306, at least one of the gaming machines is reconfigured based at least on the at least one statistical quantity.

At 1308, the respective player playing the respective reconfigured gaming machine is provided with a number of bonus points and an amount of extra-award during a second period of time. During the second period of time, the amount of extra-award accrues at a rate different from an extra-award accrual rate for the first period of time.

In some embodiments, to determine at least one statistical quantity from the gathered data may include to determine a respective player rate of play for each player playing a respective one of the number of gaming machines. In that case, in some embodiments, to reconfigure at least one of the gaming machines based at least on the at least one statistical quantity may include for each player playing a respective one of the reconfigured at least one gaming machine, to determine to reconfigure the at least one gaming machine such that the extra-award accrual rate during the second period of time is less than the extra-award accrual rate during the first period of time in response to determining the respective player play rate for the respective player is less than a player play rate threshold, and to determine to reconfigure the at least one gaming machine such that the extra-award accrual rate during the second period of time is greater than the extra-award accrual rate during the first period of time in response to determining the respective player play rate for the respective player is greater than the player play rate threshold.

In some embodiments, to determine at least one statistical quantity from the gathered data may include to determine a respective average wager for each player playing a respective one of the number of gaming machines. In that case, in some embodiments, to reconfigure at least one of the gaming machines based at least on the at least one statistical quantity may include for each player playing a respective one of the reconfigured at least one gaming machine, to determine to reconfigure the at least one gaming machine such that the extra-award accrual rate during the second period of time is less than the extra-award accrual rate during the first period of time in response to determining the respective average wager for the respective player is less than an average wager threshold, and to determine to reconfigure the at least one gaming machine such that the extra-award accrual rate during the second period of time is greater than the extra-award accrual rate during the first period of time in response to determining the respective average wager for the respective player is greater than the average wager threshold.

In some embodiments, to determine at least one statistical quantity from the gathered data may include to determine a respective gain rate for respective one of the number of gaming machines, wherein the respective gain rate is given the by (TCA−TPA)/N, where TCA, total collected amount, is an aggregate amount of collected wagers placed at the respective gaming machine during the first period of time, where TPA, total payout amount, is an aggregate amount of the payout amounts from the respective gaming machine during the first period of time, and N is one of a respective number of games played at the respective gaming machine during the first period of time or the first period of time. In that case, in some embodiments, to reconfigure at least one of the gaming machines based at least on the at least one statistical quantity may include for each reconfigured gaming machine of the at least one reconfigured gaming machine, to determine to reconfigure the respective gaming machine such that the extra-award accrual rate during the second period of time is less than the extra-award accrual rate during the first period of time in response to determining the respective gain rate for the respective gaming machine is less than a gain rate threshold, and to determine to reconfigure the respective gaming machine such that the extra-award accrual rate during the second period of time is greater than the extra-award accrual rate during the first period of time in response to determining the respective gain rate for the respective gaming machine is greater than the gain rate threshold.

In some embodiments, to determine at least one statistical quantity from the gathered data may include to determine an average gaming machine occupancy rate for the number of gaming machines, wherein the average gaming machine occupancy rate is an average over the number of gaming machines of an aggregate amount of time that each respective one of the number of gaming machines is being played during the first period of time divided by a length of time for the first period of time. In other words, for a given gaming machine during a given period of time, the gaming machine is used/played/occupied by at least one player for a certain amount of time, $t_{OCC}$, The occupancy rate for the given gaming machine is given by $t_{OCC}/T$, where T is the length of time of the given period of time. The occupancy rates of multiple machines may be averaged together to yield the average gaming machine occupancy rate.

In some embodiments, to reconfigure at least one of the gaming machines based at least on the at least one statistical quantity may include to determine to reconfigure at least one gaming machine such that the respective extra-award accrual rate during the second period of time is less than the respective extra-award accrual rate during the first period of time for each respective one of the at least one reconfigured gaming machine in response to determining the average gaming machine occupancy rate is less than an average gaming machine occupancy rate threshold, and to determine to reconfigure at least one gaming machine such that the respective extra-award accrual rate during the second period of time is greater than the respective extra-award accrual rate during the first period of time for each respective one of the at least one reconfigured gaming machine in response to determining the average gaming machine occupancy rate is greater than an average gaming machine occupancy rate threshold.

In some embodiments, the method 1300 may optionally, provide a respective player playing a respective one of the at least one reconfigured gaming machine with notification of the reconfiguration of the respective gaming machine prior to the reconfiguration of the respective gaming machine. In that case, in some embodiments, the method 1300 may optionally, to reconfigure at least one of the gaming machines based at least on the at least one statistical quantity may include to reconfigure a respective gaming machine only after receiving an indication of assent to the reconfiguration by a respective player playing the respective gaming machine.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheetare incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for enhancing gaming, comprising:

gathering data from a gaming machine that is related to at least one of gameplay and wagering by a player of a game title over a first period of time, wherein the player places a number of wagers during the first period of time;

determining at a server at least one quantity based at least on the gathered data;

determining at the server whether the determined at least one quantity exceeds an extra-bonus threshold value;

providing a respective payout amount to the player of the game title of the gaming machine in accordance with rules of the game title and a respective wager for each of the number of wagers placed by the player during the first period of time; and during the first period of time, from time to time, providing the player with bonus points at a first bonus rate in accordance with a bonus point plan based on a second quantity different from the determined at least one quantity, and determining an amount of an extra-award at an extra-award accrual rate based at least on the determined at least one quantity, the extra-award accrual rate being awarded concurrently with and in addition to the first bonus rate.

2. The method of claim 1 wherein determining at least one quantity based at least on gathered data includes determining a loss rate for the player, the loss rate given by (TPA - TWA)/N, where the TWA, total wager amount, is an aggregate amount of the number of wagers placed by the player, where TPA, total payout amount, is an aggregate amount of the respective payout amounts for the number of wagers placed by the player, and N is one of a number of games of the game title played and a length of time.

3. The method of claim 1, further comprising:

for each of the number of wagers placed by the player during the first period of time, collecting the respective wager in accordance with rules of the game title, and wherein determining at least one statistical quantity based at least on gathered data comprises determining a gain rate for an entity collecting the respective wagers, the gain rate given by (TCA−TPA)/N, where the TCA, total collected amount, is an aggregate amount of the collected wagers placed the player, where TPA, total payout amount, is an aggregate amount of the respective payout amounts for the number of wagers placed by the player, and N is one of a number of games of the game title played or a length of time.

4. The method of claim 1 wherein determining at least one quantity based at least on gathered data includes determining a play rate for the player, the play rate given by a number of games of the game title played by the player divided by the first period of time.

5. The method of claim 1 wherein determining at least one quantity based at least on gathered data includes determining a wager rate for the player, the wager rate given by an aggregate of a respective amount of each respective wager of the number of wagers divided by the number wagers.

6. The method of claim 1, further comprising:

providing the player with an offer to reconfigure a gaming machine being played by the player.

7. The method of claim 6, further comprising:

reconfiguring the gaming machine from a configuration of the gaming machine during the first period of time to a different configuration in response to the player accepting the offer to reconfigure the gaming machine.

8. The method of claim 1, further comprising:

reconfiguring the gaming machine to provide a round of the game title at a new rate of play, wherein the new rate of play is different from a rate of play for a round of the game title during the first period of time.

9. The method of claim 1, comprising:

reconfiguring the gaming machine to provide a respective amount of extra-award based at least on a new bonus plan, wherein the new bonus plan is different from a bonus plan provided to the player during the first period of time and the respective amount of extra-award is provided to maintain an average gaming machine collection rate below a collection rate threshold.

10. The method of claim 9 wherein reconfiguring the gaming machine to provide a respective amount of extra-award based at least on a new bonus plan includes changing a rate of extra-bonus point accrual based at least on an aggregate amount of the wagers placed during the first period of time.

11. The method of claim 9 wherein reconfiguring the gaming machine to provide a respective amount of extra-award based at least on a new bonus plan includes changing a rate of extra-bonus point accrual based at least on an aggregate amount of the payouts during the first period of time.

12. The method of claim 1, further comprising:

determining a total number of extra-awards based at least on the extra-award accrual rate during the first period of time;

determining a second extra-award accrual rate based at least on the data gathered during the first period of time; and during a second period of time, from time to time, determining an amount of an extra-award based at least on the determined second extra-award accrual rate.

13. The method of claim 1, further comprising:

identifying the player based at least on information indicative of a member identification;

associating at least a portion of an aggregate of the bonus points provided to the player during the first period of time with a member account based at least on the member identification; and associating at least a portion of an aggregate of the amount of extra-award determined during the first period of time with a member account based at least on the member identification.

14. The method of claim 1, further comprising:

identifying a number of other players based at least on information indicative of a respective member identification for each of the number of other players, each of the other players associated with a respective member account; and associating at least a portion of an aggregate of the amount of extra-award determined during the first period of time with the respective member account associated with a respective one of the other players.

15. The method of claim 14, further comprising:

notifying at least one respective player of the other players that the respective player receives at least a portion of the determined amount of the extra-award.

16. The method of claim 14, further comprising:

notifying the player that at least one respective player of the other players receives at least a portion of the determined amount of the extra-award.

17. The method of claim 14, further comprising:

notifying the player of an account having a least a portion of the determined amount of the extra-award associated therewith, wherein no association between the account and the player exists; and providing the player with account access.

18. The method of claim 17, wherein providing the player with account access includes providing the player with a tangible medium carrying information indicative of an account identifier for the account.

19. The method of claim 17, wherein providing the player with account access includes providing the player with information indicative of an account identifier for the account.

20. The method of claim 1, further comprising:

notifying the player that the player may receive at least a portion of the determined amount of the extra-award subject to the player joining a membership club.

21. The method of claim 20, further comprising:

enrolling the player in the membership club; and associating at least a portion of the determined amount of extra-award with a member account established for the player.

22. A method for enhancing gaming, comprising:

gathering data with a server from a plurality of gaming machines, the gathered data being related to player activity on the plurality of gaming machines during a first period of time;

determining at the server at least one quantity based at least on the gathered data;

reconfiguring with the server at least one of the gaming machines based at least on the at least one quantity; and for each player playing a respective one of the reconfigured at least one gaming machines, providing the respective player with a number of bonus points at a bonus point rate and an amount of extra-award during a second period of time, wherein during the second period of time the amount of extra-ward accrues at a rate different from an extra-award accrual rate for the first period of time, wherein the extra-award accrual rate of the first period and the extra-award accrual rate of the second period are respectively awarded concurrently with and in addition to the bonus point rate.

23. The method of claim 22 wherein determining at least one quantity based at least on gathered data includes determining a respective player rate of play for each player playing a respective one of the number of gaming machines.

24. The method of claim 23 wherein reconfiguring at least one of the gaming machines based at least on the at least one quantity includes:

determining to reconfigure a first gaming machine such that the extra-award accrual rate during the second period of time is less than the extra-award accrual rate during the first period of time in response to determining the respective player play rate for a first player is less than a player play rate threshold, and determining to reconfigure a second gaming machine such that the extra-award accrual rate during the second period of time is greater than the extra-award accrual rate during the first period of time in response to determining the respective player play rate for a second player is greater than the player play rate threshold.

25. The method of claim 22 wherein determining at least one quantity based at least on gathered data includes determining a respective average wager for each player playing a respective one of the number of gaming machines.

26. The method of claim 25 wherein reconfiguring at least one of the gaming machines based at least on the at least one quantity includes:

determining to reconfigure a first gaming machine such that the extra-award accrual rate during the second period of time is less than the extra-award accrual rate during the first period of time in response to determining the respective average wager for a first respective player is less than an average wager threshold, and determining to reconfigure a second gaming machine such that the extra-award accrual rate during the second period of time is greater than the extra-ward accrual rate during the first period of time in response to determining that the respective average wager for a second respective player is greater than the average wager threshold.

27. The method of claim 22 wherein determining at least one quantity based at least on gathered data includes determining a respective gain rate for a respective one of the number of gaming machines, wherein the respective gain rate is given by (TCA−TPA)/N, where TCA, total collected amount, is an aggregate amount of collected wagers placed at the respective gaming machine during the first period of time, where TPA, total payout amount, is an aggregate amount of the payout amounts from the respective gaming machine during the first period of time, and N is one of a respective number of games played at the respective gaming machine during the first period of time or the first period of time.

28. The method of claim 27 wherein reconfiguring at least one of the gaming machines based at least on the at least one quantity includes:

for each reconfigured gaming machine of the at least one reconfigured gaming machine, determining to reconfigure the respective gaming machine such that the extra-award accrual rate during the second period of time is less than the extra-award accrual rate during the first period of time in response to determining the respective gain rate for the respective gaming machine is less than a gain rate threshold, and determining to reconfigure the respective gaming machine such that the extra-award accrual rate during the second period of time is greater than the extra-award accrual rate during the first period of time in response to determining the respective gain rate for the respective gaming machine is greater than the gain rate threshold.

29. The method of claim 22 wherein determining at least one quantity based at least on gathered data includes determining an average gaming machine occupancy rate for the number of gaming machines, wherein the average gaming machine occupancy rate is an average over the number of gaming machines of an aggregate amount of time that each respective one of the number of gaming machines is being played during the first period of time divided by a length of time for the first period of time.

30. The method of claim 29 wherein reconfiguring at least one of the gaming machines based at least on the at least one quantity includes:

determining to reconfigure a first gaming machine such that the respective extra-award accrual rate during the second period of time is less than the respective extra-award accrual rate during the first period of time for the first gaming machine in response to determining that the average gaming machine occupancy rate is less than an average gaming machine occupancy rate threshold; and determining to reconfigure a second gaming machine such that the respective extra-award accrual rate during the second period of time is greater than the respective extra-award accrual rate during the first period of time for the second gaming machine in response to determining that the average gaming machine occupancy rate is greater than an average gaming machine occupancy rate threshold.

31. The method of claim 22 further comprising:

providing a respective player playing a respective one of the at least one reconfigured gaming machine with notification of the reconfiguration of the respective gaming machine prior to the reconfiguration of the respective gaming machine.

32. The method of claim 31 wherein reconfiguring at least one of the gaming machines based at least on the at least one quantity includes reconfiguring a respective gaming machine only after receiving an indication of assent to the reconfiguration by a respective player playing the respective gaming machine.

33. A system for enhancing game play, comprising:

a plurality of gaming machines, wherein a number of the gaming machines of the plurality of gaming machines are played by a number of players during a first period of time; and at least one server that gathers data related to activity of the number of players during the first period of time, determines at least one quantity based at least on the gathered data and selectively reconfigures at least one of the number of gaming machines based at least on the determined at least one quantity; and wherein a respective player playing a respective one of the at least one reconfigured gaming machines is provided with a first number of bonus points at a bonus point rate and a first amount of extra-award during the first period of time, and the respective player is provided a second amount of extra-award during a second period of time, wherein during the second period of time the second amount of extra-award accrues at a rate different from an extra-award accrual rate for the first period of time, and wherein the extra-award accrual rate of the first period and the extra-award accrual rate of the second period are awarded in addition to the bonus point rate.

34. The system of claim 33 wherein the at least one server determines a respective player rate of play for each player playing a respective one of the number of gaming machines, and wherein the determined at least one quantity is based at least on the respective player rate of play for each player playing a respective one of the number of gaming machines.

35. The system of claim 34 wherein the at least one server determines, to reconfigure a first of the at least one gaming machines such that the extra-award accrual rate during the second period of time is less than the extra-award accrual rate during the first period of time in response to determining the respective player play rate for a first respective player is less than a player play rate threshold, and to reconfigure a second of the at least one gaming machines such that the extra-award accrual rate during the second period of time is greater than the extra-award accrual rate during the first period of time in response to determining the respective player play rate for a second respective player is greater than the player play rate threshold.

36. The system of claim 33 wherein the at least one server determines a respective average wager for each player playing a respective one of the number of gaming machines, and wherein the at least one quantity determined by the at least one server is based at least on the respective average wager for each player playing a respective one of the number of gaming machines.

37. The system of claim 36 wherein the at least one server determines, to reconfigure a first of the at least one gaming machines such that the extra-award accrual rate during the second period of time is less than the extra-award accrual rate during the first period of time in response to determining the respective average wager for a first respective player is less than an average wager threshold, and to reconfigure a second of the at least one gaming machines such that the extra-award accrual rate during the second period of time is greater than the extra-award accrual rate during the first period of time in response to determining the respective average wager for a second respective player is greater than the average wager threshold.

38. The system of claim 33 wherein the at least one server determines a respective gain rate for a respective one of the number of gaming machines, wherein the respective gain rate is given by (TCA−TPA)/N, where TCA, total collected amount, is an aggregate amount of collected wagers placed at the respective gaming machine during the first period of time, where TPA, total payout amount, is an aggregate amount of the payout amounts from the respective gaming machine during the first period of time, and N is one of a respective number of games played at the respective gaming machine during the first period of time or the first period of time.

39. The system of claim 38 wherein the at least one server determines, to reconfigure a first gaming machine such that the extra-award accrual rate during the second period of time is less than the extra-award accrual rate during the first period of time in response to determining that the respective gain rate for the first gaming machine is less than a gain rate threshold; and to reconfigure a second gaming machine such that the extra-award accrual rate during the second period of time is greater than the extra-award accrual rate during the first period of time in response to determining that the respective gain rate for the second gaming machine is greater than the gain rate threshold.

40. The system of claim 33 wherein the at least one server determines an average gaming machine occupancy rate for the number of gaming machines, wherein the average gaming machine occupancy rate is an average over the number of gaming machines of an aggregate amount of time that each respective one of the number of gaming machines is being played during the first period of time divided by a length of time for the first period of time, and wherein the at least one quantity determined by the at least one server is based at least on the average gaming machine occupancy rate for the number of gaming machines.

41. The system of claim 40 wherein the at least one server determines, to reconfigure a first gaming machine such that the respective extra-award accrual rate for the first gaming machine during the second period of time is less than the respective extra-award accrual rate for the first gaming machine during the first period of time in response to determining the average gaming machine occupancy rate is less than an average gaming machine occupancy rate threshold, and to reconfigure a second gaming machine such that the respective extra-award accrual rate for the second gaming machine during the second period of time is greater than the respective extra-award accrual rate for the second gaming machine during the first period of time in response to determining the average gaming machine occupancy rate is greater than an average gaming machine occupancy rate threshold.

42. The system of claim 33 wherein a respective one of the at least one of the reconfigured gaming machines provides a respective player playing the respective one of the at least one reconfigured gaming machine with notification of the reconfiguration of the respective gaming machine prior to the reconfiguration of the respective gaming machine.

43. The system of claim 42 wherein the at least one server reconfigures a respective gaming machine only after receiving an indication of assent to the reconfiguration by a respective player playing the respective gaming machine.

44. The method of claim 22 wherein during the second period of time the amount of extra-award accrues at the rate different from the extra-award accrual rate for the first period of time such that an average collection rate for the respective reconfigured gaming machine during the second period is approximately the same as an average collection rate for the respective reconfigured gaming machine during the first period.

45. The system of claim 33 wherein during the second period of time the amount of extra-award accrues at the rate different from the extra-award accrual rate for the first period of time such that an average collection rate for the at least one reconfigured gaming machine during the second period is approximately the same as an average collection rate for the at least one reconfigured gaming machine during the first period.

46. The system of claim 33 wherein during the second period of time the amount of extra-award accrues at the rate different from the extra-award accrual rate for the first period of time such that an average collection rate for the at least one reconfigured gaming machine during the second period is regulated with the extra-award accrual rate to maintain the average collection rate below a collection rate threshold.

* * * * *